(12) United States Patent
Korolchuk et al.

(10) Patent No.: US 7,425,344 B2
(45) Date of Patent: *Sep. 16, 2008

(54) PROCESS FOR PRODUCING A MILLED WHOLE-GRAIN WHEAT FLOUR AND PRODUCTS THEREOF

(75) Inventors: Theodore Korolchuk, Papillion, NE (US); Elizabeth Arndt, Omaha, NE (US)

(73) Assignee: ConAgra Foods Food Ingredients Company, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/945,199

(22) Filed: Sep. 20, 2004

(65) Prior Publication Data

US 2005/0136174 A1    Jun. 23, 2005

Related U.S. Application Data

(63) Continuation-in-part of application No. 10/738,732, filed on Dec. 17, 2003.

(51) Int. Cl.
*A23L 1/10* (2006.01)

(52) U.S. Cl. .................. 426/518; 426/463; 426/464; 426/469; 426/622

(58) Field of Classification Search ............. 426/622, 426/463, 464, 469, 518
See application file for complete search history.

(56) References Cited

U.S. PATENT DOCUMENTS

| | | | |
|---|---|---|---|
| 2,230,417 A | * | 2/1941 | Wellinghoff ............ 426/622 |
| 2,895,831 A | * | 7/1959 | Tewfic .................. 426/436 |
| 3,100,708 A | * | 8/1963 | Emerson, Jr. ............ 426/62 |
| 4,919,952 A | | 4/1990 | Sadaranganey et al. |
| 4,956,190 A | * | 9/1990 | Chawan et al. ........... 426/269 |
| 5,114,079 A | | 5/1992 | Curran |
| 5,192,028 A | | 3/1993 | Curran |
| 6,372,281 B1 | * | 4/2002 | Metzger et al. ........... 426/622 |
| 6,495,191 B1 | | 12/2002 | Maldonado |
| 6,569,483 B2 | | 5/2003 | Zohoungbogbo |
| 6,613,372 B1 | | 9/2003 | Schlebusch et al. |
| 2003/0104103 A1 | | 6/2003 | Monsalve-Gonzalez |
| 2005/0255219 A1 | | 11/2005 | Dreese et al. ........... 426/622 |

FOREIGN PATENT DOCUMENTS

CA    2141974    8/1995

OTHER PUBLICATIONS

U.S. Appl. No. 08/194,672, filed Feb. 14, 1994, Michael J. Wolt et al.
U.S. Appl. No. 08/583,246, filed Jan. 5, 1996, Michael J. Wolt et al.

(Continued)

*Primary Examiner*—Helen F Pratt
(74) *Attorney, Agent, or Firm*—Merchant & Gould P.A.

(57) ABSTRACT

A process for producing an ultrafine-milled whole-grain wheat flour which has the full nutritional value of wheat kernels, while retaining the texture of refined wheat flour and an appearance similar to refined wheat flour, and the products which can be made from the ultrafine-milled whole-grain wheat flour. The process can also be used for producing an ultrafine-milled coarse fraction, which can be used as a replacement and to fortify refined wheat flour. The ultrafine-milled coarse fraction can be used in bakery products, snack products and food products.

31 Claims, 17 Drawing Sheets

OTHER PUBLICATIONS

"Unifine Flour, Milling, Baking, and Consumer Acceptance Tests," by George E. Pease, et al., Washington State Institute of Technology, Bulletin No. 206, Apr. 1950, 44 pages.

McBride, J., Back to the Old Grind-er, Argicultural Research, May 2000, p. 21.

Atwell, W. A., An Overview of Wheat Development, Cultivation, and Production, Cereal Foods World, Feb. 2001, vol. 46, No. 2, pp. 59-62.

Gap Mill GMD, Bauermeister, Inc., 2 pages, date not furnished.

Marquart, L., et al., Whole Grains and Health Past, Present, and Future, aib Technical Bulletin, Feb. 2003, vol. XXV, Issue 2, pp. 1-14.

Erhard-Hudson, J., Unifine flour from Azure Standard/Azure Farms, Sep. 2001, www.moscowfoodcoop.com/archive/azure.html, 3 pages.

\* cited by examiner

FIG. 2

NUTRITIONAL COMPARISION OF REFINED WHEAT FLOUR AND WHOLE-GRAIN WHEAT FLOUR
(USDA National Nutrient Database for Standard Reference, Release 15 (8/2002))

|  | Refined Wheat Flour | Whole Wheat Flour |
|---|---|---|
|  | 12% Moisture Basis | |
| % Protein* | 10.33% | 13.70% |
| % Fat* | 0.98% | 1.87% |
| % Minerals* | 0.50% | 1.60% |
| % Total Carbohydrates* | 76.31% | 72.57% |
| % Total Dietary Fiber* | 2.70% | 12.20% |

Traditional Mill Process Flow Diagram

Fig. 7

| Wheat Variety = Platte | Particle Size Alpine Air Jet On US 100 Wire | Particle Size Alpine Air Jet On US 200 Wire | Particle Size Alpine Air Jet On US 325 Wire | Particle Size Alpine Air Jet On US 400 Wire |
|---|---|---|---|---|
| Fine Fraction (Refined wheat flour) Step 1 of 2-step process | 1.4 | 47.0 | 77.2 | 98.0 |
| Ultrafine-Milled Coarse Fraction Step 2 of 2-step process | 4.0 | 46.2 | 67.5 | 99.8 |
| Ultrafine-Milled Whole-Grain Wheat Flour (Blend of Fine Fraction and Ultrafine-Milled Coarse Fraction) | 2.0 | 48.0 | 73.4 | 98.4 |

FIG. 8

NUTRITIONAL COMPARISION OF REFINED WHEAT FLOUR, ULTRAFINE-MILLED WHOLE-GRAIN WHEAT FLOUR AND ULTRAFINE COARSE FRACTION

|  | Refined Wheat Flour[1] | Ultrafine-Milled Whole-Grain Wheat Flour[1] | Ultrafine-Milled Coarse Fraction[2] |
|---|---|---|---|
|  |  | 12% Moisture Basis |  |
| % Protein | 10.33% | 13.70% | 18.40% |
| % Fat | 0.98% | 1.87% | 6.10% |
| % Minerals | 0.50% | 1.60% | 5.80% |
| % Total Carbohydrates | 76.31% | 72.57% | 57.70% |
| % Total Dietary Fiber | 2.70% | 12.20% | 38.60% |

[1] USDA National Nutrient Database for standard reference, Release 15 (8/2002)
[2] ConAgra Foods data, CF1071503 hard red winter

Brownies

Fig. 9

| Ingredient | Brownie Formula 1 Control - 100% refined | | Brownie Formula 2 24% flour replacement | | Brownie Formula 3 50% flour replacement | | Brownie Formula 4 100% flour replacement | |
|---|---|---|---|---|---|---|---|---|
| | grams | Formula % | grams | Formula % | grams | Formula % | grams | Formula % |
| Refined wheat flour, pastry type | 90 | 10.34 | 68.49 | 7.88 | 45 | 5.17 | 0 | 0.00 |
| Ultrafine-milled coarse fraction | 0 | 0.00 | 21.51 | 2.47 | 45 | 5.17 | 90 | 10.35 |
| Sugar, granulated | 392 | 45.02 | 392 | 45.07 | 392 | 45.07 | 392 | 45.07 |
| Cocoa powder | 75 | 8.61 | 75 | 8.62 | 75 | 8.62 | 75 | 8.62 |
| Salt | 3 | 0.34 | 2 | 0.23 | 2 | 0.23 | 2 | 0.23 |
| Baking powder double acting | 1.2 | 0.14 | 1.2 | 0.14 | 1.2 | 0.14 | 1.2 | 0.14 |
| Butter | 113.5 | 13.04 | 113.5 | 13.05 | 113.5 | 13.05 | 113.5 | 13.05 |
| Eggs | 130 | 14.93 | 130 | 14.95 | 130 | 14.95 | 130 | 14.95 |
| Vanilla extract | 6 | 0.69 | 6 | 0.69 | 6 | 0.69 | 6 | 0.69 |
| Walnuts, chopped | 30 | 3.45 | 30 | 3.45 | 30 | 3.45 | 30 | 3.45 |
| Pecans, chopped | 30 | 3.45 | 30 | 3.45 | 30 | 3.45 | 30 | 3.45 |
| Totals | 870.7 | 100.00 | 869.7 | 100.00 | 869.70 | 100.00 | 869.70 | 100.00 |

Fig. 10

Apple Cinnamon Muffins

| Ingredient | Muffin Formula 1 24% flour replacement | | Muffin Formula 2 50% flour replacement | | Muffin Formula 3 75% flour replacement | | Muffin Formula 4 100% flour replacement | | Muffin Formula 5 100% flour replacement | |
|---|---|---|---|---|---|---|---|---|---|---|
| | grams | Formula % | grams | Formula % | grams | Formula % | grams | Formula % | grams | Formula % |
| Refined wheat flour, all purpose type | 94.4 | 13.82 | 62 | 9.08 | 31 | 4.54 | 0 | 0.00 | 0 | 0.00 |
| Ultrafine-milled coarse fraction | 29.6 | 4.33 | 62 | 9.08 | 93 | 13.61 | 124 | 16.91 | 124 | 17.12 |
| Sustagrain® whole grain barley, quick-cooking flakes | 60 | 8.78 | 60 | 8.78 | 60 | 8.78 | 60 | 8.18 | 60 | 8.28 |
| Baking Powder, double acting | 12 | 1.76 | 12 | 1.76 | 12 | 1.76 | 12 | 1.64 | 12 | 1.66 |
| Salt | 4 | 0.59 | 4 | 0.59 | 4 | 0.59 | 4 | 0.55 | 4 | 0.55 |
| Nonfat dry milk | 28 | 4.10 | 28 | 4.10 | 28 | 4.10 | 28 | 3.82 | 28 | 3.86 |
| Sugar, granulated | 140 | 20.49 | 140 | 20.49 | 140 | 20.49 | 140 | 19.10 | 125 | 17.25 |
| Cinnamon, ground 1.5% VO | 1.8 | 0.26 | 1.8 | 0.26 | 1.8 | 0.26 | 1.8 | 0.25 | 2.2 | 0.30 |
| Apples, evaporated, diced | 50 | 7.32 | 50 | 7.32 | 50 | 7.32 | 50 | 6.82 | 50 | 6.90 |
| Eggs, dry whole | 9.3 | 1.36 | 9.3 | 1.36 | 9.3 | 1.36 | 9.3 | 1.27 | 9.3 | 1.28 |
| Water | 200 | 29.28 | 200 | 29.28 | 200 | 29.28 | 250 | 34.10 | 250 | 34.51 |
| Soybean oil | 54 | 7.91 | 54 | 7.91 | 54 | 7.91 | 54 | 7.37 | 30 | 4.14 |
| Applesauce, unsweetened | 0 | 0.00 | 0 | 0.00 | 0 | 0.00 | 0 | 0.00 | 30 | 4.14 |
| Totals | 683.1 | 100.00 | 683.1 | 100.00 | 683.10 | 100.00 | 733.10 | 100.00 | 724.50 | 100.00 |

Fig. 11

Chocolate Chip Cookies

| Ingredient | Chocolate Chip Cookie Formula 1 Control - 100% refined wheat flour | | Chocolate Chip Cookie Formula 2 24% flour replacement | | Chocolate Chip Cookie Formula 3 50% flour replacement | |
|---|---|---|---|---|---|---|
| | grams | Formula % | grams | Formula % | grams | Formula % |
| Refined wheat flour, all-purpose type | 166.91 | 19.53 | 127 | 14.86 | 83.5 | 9.77 |
| Ultrafine-milled coarse fraction | 0 | 0.00 | 39.9 | 4.67 | 83.5 | 9.77 |
| Light Margarine | 113.5 | 13.28 | 113.5 | 13.28 | 113.5 | 13.28 |
| Sugar, light brown | 229.84 | 26.90 | 229.84 | 26.90 | 229.84 | 26.90 |
| Sugar, granulated | 43.9 | 5.14 | 43.9 | 5.14 | 43.9 | 5.14 |
| Egg Beaters® | 56.42 | 6.60 | 56.42 | 6.60 | 56.42 | 6.60 |
| Vanilla extract | 7.51 | 0.88 | 7.51 | 0.88 | 7.51 | 0.88 |
| Baking soda | 3.34 | 0.39 | 3.34 | 0.39 | 3.34 | 0.39 |
| Baking powder, double acting | 2.17 | 0.25 | 2.17 | 0.25 | 2.17 | 0.25 |
| Salt | 1 | 0.12 | 1 | 0.12 | 1 | 0.12 |
| Instant coffee granules | 3 | 0.35 | 3 | 0.35 | 3 | 0.35 |
| Chocolate chips, semisweet | 226.83 | 26.55 | 226.83 | 26.55 | 226.83 | 26.55 |
| Totals | 854.42 | 100.00 | 854.41 | 100.00 | 854.51 | 100.00 |

Fig. 12

Breads (Whole Wheat)

| Ingredient (SPONGE) | Whole Wheat Bread Formula 1 25% flour replacement grams | Whole Wheat Bread Formula 2 50% flour replacement grams |
|---|---|---|
| Ultrafine-milled coarse fraction | 187.5 | 375.0 |
| Refined Wheat flour | 262.5 | 75.0 |
| Water | 375.0 | 375.0 |
| Gluten | 37.5 | 72.53 |
| Compressed yeast | 22.5 | 22.5 |
| Soybean oil | 22.5 | 22.5 |
| Sugar | 0.0 | 15.0 |
| Sodium stearoyl lactylate | 3.75 | 3.75 |
| Yeast food | 2.85 | 2.85 |
| Sponge WT Totals | 914.1 | 964.13 |

| Ingredient (DOUGH) | grams | grams |
|---|---|---|
| Refined Wheat flour | 300 | 300 |
| Water | 46.5 | 46.5 |
| Sugar | 90.0 | 90.0 |
| Salt | 15.0 | 15.0 |
| Compressed Yeast | 7.5 | 7.5 |
| Emulsifier | 3.75 | 3.75 |
| Ascorbic acid solution | 50.0 | 50.0 |
| Azodicarbonamide solution | 17.0 | 17.0 |
| Dough WT | 529.75 | 529.75 |
| Totals | 1443.85 | 1493.88 |

FIG. 13

Tortillas (Flour)

| Ingredient | Flour Tortillas Formula 1 | |
|---|---|---|
| | grams | Formula % |
| Ultrafine-Milled Coarse Fraction | 150.55 | 4.89 |
| Whole Wheat flour | 59.04 | 1.92 |
| Gluten | 383.76 | 12.47 |
| Resistant Starch | 516.6 | 16.79 |
| Soy Protein Isolate | 239.11 | 7.77 |
| Oat Fiber | 76.75 | 2.49 |
| Water | 1364.84 | 44.35 |
| Shortening | 227.3 | 7.39 |
| Salt | 22.4 | 0.73 |
| Baking powder | 23.62 | 0.77 |
| Fumaric acid | 5.31 | 0.17 |
| Calcium Propionate | 3.84 | 0.12 |
| Sodium Metabisulfite | 0.3 | 0.01 |
| Potassim sorbate | 3.54 | 0.12 |
| Sucralose, 25% Aqueous Concentrate | 0.59 | 0.02 |
| Totals | 3077.55 | 100.00 |

Fig. 14

Crisped Cereal

| Ingredient | Crisped Cereal Formula 1 Control - 100% rice flour Formula % | Crisped Cereal Formula 2 24% flour replacement Formula % |
|---|---|---|
| Rice flour, long grain | 95.00 | 23.25 |
| Ultrafine-milled coarse fraction | 0.00 | 24.00 |
| Soy protein isolate | 0.00 | 42.75 |
| Whole oat flour | 0.00 | 5.00 |
| Malt extract | 2.00 | 0.00 |
| Toasted oat flour | 0.00 | 2.00 |
| Sugar | 2.75 | 2.75 |
| Salt | 0.25 | 0.25 |
| Totals | 100.00 | 100.00 |

Pasta

| Ingredient | Pasta Formula 1<br>Control - 100% Durum Semolina<br>Formula % | Pasta Formula 2<br>47.5% Durum Semolina<br>Formula % | Pasta Formula 3<br>100% Durum Semolina<br>Formula % | Pasta Formula 4<br>24% Flour replacement<br>Formula % |
|---|---|---|---|---|
| Ultrafine-milled whole-grain wheat flour | 0.00 | 51.00 | 0.00 | 0.00 |
| Ultrafine-milled coarse fraction | 0.00 | 0.00 | 0.00 | 23.41 |
| Durum Semolina | 98.50 | 47.50 | 97.93 | 74.52 |
| Egg white | 1.50 | 1.50 | 2.07 | 2.07 |
| Totals | 100.00 | 100.00 | 100.00 | 100.00 |

Fig. 15

Total Antioxidant Capacity Of Wheat Milling Fractions

|  | μmole TE /100 g |
|---|---|
| ➢ Refined Wheat Flour | 1,000 (n=1) |
| ➢ Refined Wheat Flour (Platte variety) | 1,900 (n=1) |
| ➢ Ultrafine-milled Whole-Grain Wheat Flour (Platte variety) | 2,800 (n=1) |
| ➢ Wheat Bran | 3,600 (n=2) |
| ➢ Coarse fraction (Platte variety) | 6,700 (n=1) |
| ➢ Ultrafine-Milled Coarse Fraction (Platte variety) | 7,400 (n=1) |
| ➢ Wheat germ | 8,400 (n=6) |

*Figure 16a*

Total Antioxidant Capacity Comparison Wheat Fractions vs. Fruits & Vegetables

| | | | μmole TE /100 g |
|---|---|---|---|
| | | Artichoke | 9,409 |
| | | Dried Plums | 8,578 |
| Wheat Germ | 8,400 → | Ultra-fine milled coarse fraction (Platte variety) | 7,400 |
| | | Blueberries, Cultivated | 6,220 |
| Wheat Bran | 3,600 → | Strawberries | 3,577 |
| | | Raisins | 3,037 |
| | | Spinach | 2,640 |
| | | Broccoli, Raw | 1,590 |
| Refined Flour | 1,000 → | Tomatoes, Raw | 337 |

Microbial Loads

| Ingredient | Aerobic Plate Count CFU/G | Coliforms - Petrifilm CFU/G |
|---|---|---|
| Ultrafine-Milled Whole-Grain Wheat Flour, Platte HWW * | 20,000 | 530 |
| Ultrafine-Milled Whole-Grain Wheat Flour, Platte HWW | 20,000 | 1,800 |
| Average | 20,000 | 1,165 |
| Coarse Fraction (Millfeed, Platte HWW) | 130,000 | 1,200 |
| Coarse Fraction (Millfeed, Platte HWW) | 60,000 | 1,200 |
| Average | 95,000 | 1,200 |
| Ultrafine-Milled Coarse Fraction (Millfeed, Platte HWW) | 10,000 | 1,300 |
| Ultrafine-Milled Coarse Fraction (Millfeed, Platte HWW) | 10,000 | 500 |
| Average | 10,000 | 900 |

\* *Platte HWW = Platte Hard White Winter Wheat*

PROCESS FOR PRODUCING A MILLED WHOLE-GRAIN WHEAT FLOUR AND PRODUCTS THEREOF

CROSS REFERENCES TO RELATED APPLICATIONS

This application is a continuation-in-part application of commonly owned U.S. patent application Ser. No. 10/738,732, filed on Dec. 17, 2003, entitled: A PROCESS FOR PRODUCING AN ULTRAFINE-MILLED WHOLE-GRAIN WHEAT FLOUR AND PRODUCTS THEREOF, U.S. patent application Ser. No. 10/738,732 is incorporated by reference in its entirety herein.

FIELD OF INVENTION

The present invention relates to a process for producing an ultrafine-milled whole-grain wheat flour and the products thereof. The process includes using the entire wheat kernel in order to manufacture an ultrafine-milled whole-grain wheat flour and products thereof. Specifically, the invention relates to the use of the ultrafine-milled coarse fraction produced by the method and products using the same.

BACKGROUND OF INVENTION

Refined wheat flour (white flour) is used to produce a wide range of popular bakery and snack products, including breads, bagels, muffins, waffles, pizza crusts, cookies, crackers, bakery mixes, fruit and grain bars, tortillas, brownies, pastries, pie crusts, par-baked bakery products, cakes, quick-breads, sweet rolls, donuts, microwavable snack products, snack chips, and extruded snacks, which traditionally have a uniform, light-colored appearance and smooth (non-gritty) texture. Comparatively, products made with traditional whole-grain wheat flour, tend to have a coarser, dense texture and a darker, less consistent appearance. Refined wheat flour is also used in a number of other applications such as pastas, ready-to-drink beverages, instant beverages, meat extenders, meat (vegetarian) substitutes, nutritional bars, and ready-to-eat cereals, confectioneries, seasoning blends, gravy and sauce mixes, soup mixes, roux, coatings or breadings, cookie dough or other ice cream inclusions, and various other applications.

The wheat kernel consists of three fractions, the endosperm, bran, and germ, which are compositionally and morphologically very different. Thus, products will have different coarseness, textures and color depending on the portion of the wheat kernel being used. Refined wheat flour is formed primarily from the endosperm of the wheat kernel along with small amounts of bran and germ. The endosperm comprises approximately 82% of the wheat kernel. The function of the endosperm is to provide energy for the embryonic plant during germination of the wheat kernel. The endosperm contains approximately 75% starch and 10-14% protein. Compared to the bran and germ, the endosperm contains low amounts of fiber, lipids, vitamins, minerals, pigments and other phytonutrients. This helps give the refined wheat flour its consistent, fine, starchy texture and off-white color compared to whole-grain wheat flour. The bran consists of several cell layers and contains a significant amount of fiber. The bran includes the aleurone layer, which separates the endosperm from the bran layers. The aleurone layer is rich in proteins, vitamins and phytonutrients, such as ferulic acid. The germ is rich in lipids, fiber, vitamins, minerals and phytonutrients, such as flavonoids. Thus, refined wheat flour, which is made primarily of endosperm is mainly starch and has limited amounts of fiber, proteins, lipids, vitamins, minerals and other phytonutrients.

While refined wheat flour offers the texture and color consumers desire, it does not have the nutritional value of whole-grain wheat flour. Many consumers, particularly children, prefer the texture, appearance and flavor of bakery and snack products made with refined wheat flour compared to products made from whole-grain wheat flour. It is estimated that only 0.8-1 of the 6.7 servings of grain-based foods that adult Americans (20 years or older) consume per day is whole-grain.

The importance of increasing whole-grain consumption is reflected in the changes in recommendations set forth by government and health organization expert groups. In the Healthy People 2010 Report (National Academy Press, 1999), it is recommended that individuals two years and older should consume at least six daily servings of grain products with at least three being whole grains. In the 2000 Dietary Guidelines for Americans (Fifth Edition, USDA, USDHHS, Home and Garden Bulletin No. 232), a separate recommendation was added for grains, specifically, that individuals should choose a variety of grains daily, especially whole grains. The USDA is in the process of revising dietary guidelines. The 2005 Report of the Dietary Guidelines Advisory Committee supports the development of dietary guidelines that suggest the population "increase daily intake of fruits and vegetables, whole grains, and nonfat or low-fat milk and milk products." (2005 Dietary Guidelines Advisory Committee Report—Executive Summary). According to the guidelines, "diets rich in whole grains can reduce the risk of coronary heart disease and type 2 diabetes and help weight control." The Advisory Committee recommends consuming at least three servings of whole grains per day to reduce the risk of coronary heart disease, type 2 diabetes and help in weight maintenance. The American Heart Association, American Diabetes Association and the American Cancer Society also make specific recommendations regarding increasing the consumption of whole grains.

Whole-grain wheat flour has increased nutritional value compared to refined wheat flour because it includes the entire wheat kernel, including the bran, germ and endosperm, rather than primarily just the endosperm, FIGS. 1 and 2. Thus, whole-grain wheat flour is higher in fiber, protein, lipids, vitamins, minerals, and phytonutrients, including phenolic compounds and phytates, which function as dietary antioxidants, when compared to refined wheat flour.

The use of whole-grain wheat flour in products typically made with refined wheat flour changes the texture and color of the products. Since consumers typically prefer the consistent texture and lighter color of products using refined wheat flour, these effects on product texture and appearance limit the use of traditional whole-grain wheat flour in bakery and snack products. When whole-grain wheat flour is used in bakery and snack products in place of the refined wheat flour, the products typically contain visible bran specks, have a coarser, heavier texture, and a darker color compared to products made with the refined wheat flour.

The differences in texture and color, along with the visible bran specks within the product makes the product less desirable to most consumers. It has been found that in many instances the increased nutritional value of the products using the whole-grain wheat flour does not overcome the consumers desire to have a consistent texture, light colored product which does not include bran specks. Based on the nutritional value of whole-grain wheat flour versus refined wheat flour, including the fact that the whole-grain wheat flour contains more fiber, protein, lipids, vitamins, minerals, and other nutrients and less starch, it would be preferred to use whole-grain wheat flour in a variety of prepared products for consumer consumption.

Compared to whole-grain wheat flour, refined wheat flour is higher in calories and starch, while containing only about a fifth of the dietary fiber found in whole-grain wheat flour and about 7-10% less protein than whole-grain wheat flour, as shown in FIGS. 1 and 2. Recently, health practitioners have been promoting the benefits of whole-grain foods. In particular, it is suggested that people should consume lesser amounts of processed foods containing high amount of starches and sugars in order to have a healthier overall diet.

Refined wheat flour contains high amounts of starch. Further, although enriched refined wheat flour contains thiamin, riboflavin, niacin, folic acid and iron added at or above the levels found in the wheat kernel, it does not include fiber, minerals, lipids, and phytonutrients found in whole-grain wheat flour. The fiber, minerals, lipids and phytonutrients that refined wheat flour does include, are generally present in lesser amounts than that found in whole-grain wheat flour, and their presence is largely due to small amounts of bran and germ that are present in refined wheat flour, FIG. 1.

Currently in the United States, consumption of white bread made from refined wheat flour versus whole wheat bread is about 5 to 1. For every five loaves of white bread consumed, one loaf of whole wheat bread is consumed. Given that popular bakery and snack products made with refined wheat flour are low in fiber and do not have the nutritional benefits of their respective whole-grain counterparts, it is important to develop a whole-grain wheat flour that can be used to replace refined wheat flour in bakery and snack products, yet yield products with a desirable texture and appearance that is acceptable to consumers. Such products would have enhanced nutritional value, including increased fiber and antioxidant contents, while retaining the qualities that appeal to a large segment of the population.

Populations that rely on high fiber diets typically have lower rates of heart disease, hypertension, diabetes, obesity, and cancer. In the United States, individuals typically consume 12-15 grams of fiber per day, which is half or less of the recommended level. The development of food products, which are high in fiber and other nutrients without sacrificing the look and feel of refined wheat flour, is desirable.

It is also desirable to increase the amounts of antioxidants in the diet. It is thought that antioxidants, including flavonoids, may play a role in preventing cancer. Thus, it is recommended that individuals increase consumption of foods such as fruits, vegetables and whole grains that contain antioxidants.

The antioxidant activity of food products can be measured by the ORAC (Oxygen Radical Absorbance Capacity) assay. The ORAC assay measures hydrophilic and hydrophobic antioxidant capacities of a food using fluorescein as the fluorescent probe and 2,2'-azobis(2-amidinoporpane)dihydrochloride as the peroxyl radical generator. Using the ORAC assay, the total antioxidant capacity, including the capacity due to the nutritive (Vitamins A, C, and E) and non-nutritive (flavonoids, phenolic acids, carotenoids and other phytonutrients), in a food product can be readily determined. Antioxidants, such as flavonoids, are thought to assist the body in preventing cancer.

Three sets of terms are typically used to define wheat of the species *Triticum aestivum* (common wheat). The first is hard or soft, which relates to the hardness of the kernel. The second is red or white, which relates to the presence or absence of red pigments in the outer layers of the wheat kernel. Finally, there are winter or spring wheat varieties that are categorized as such depending on when the wheat is planted. Durum wheat is of the species *Triticum durum*. Durum wheat is distinctly different from common wheat in that it produces very hard kernels and has yellow pigments throughout the endosperm rather than in the outer layers. It is typically used to produce pasta products, while common wheat is used, for example, in breads, cakes, cookies, and crackers.

Refined wheat flour is that flour prepared by grinding and bolting cleaned wheat other than durum wheat and red durum wheat. The Food and Drug Administration (FDA) requires flour to meet certain particle size standards in order to be included in the category of refined wheat flour. That particle size is described as flour in which not less than 98% passes through a cloth having openings not larger than those of woven wire cloth designated "212 μm (U.S. Wire 70)". According to the FDA Code of Federal Regulations (CFR), enriched flour is refined wheat flour which contains 2.9 mg of thiamin, 1.8 mg of riboflavin, 24 mg of niacin, 0.7 mg of folic acid and 20 mg of iron added per pound of refined wheat flour. Enriched flour may also contain calcium in the amount of 960 mg per pound of refined wheat flour. In order to meet U.S. FDA guidelines, enriched flour may not contain more than 5% by weight of wheat germ or partly defatted wheat germ.

FDA guidelines for whole wheat flour state that it the whole wheat flour is prepared by grinding cleaned wheat, other than durum wheat and red durum wheat, which once ground has a particle size wherein not less than 90% passes through a 2.36 millimeter (U.S. Wire 8) sieve and not less than 50% passes through an 850 μm (U.S. Wire 20) sieve. In whole wheat flour (whole-grain wheat flour), the proportions of the natural constituents in the wheat other than moisture remain unaltered as compared to the wheat kernels. The entire wheat kernel is used. Products are considered to be 100% whole wheat when the dough is made from whole-grain wheat flour, bromated whole wheat flour, or a combination of these. No refined wheat flour is used in these products. Whole-grain wheat flour is considered healthier than enriched refined flour because it contains the entire spectrum of nutrients that are naturally present in the wheat kernel, FIGS. 1 and 2.

In current milling processes, the endosperm is separated from the bran and the germ in order to make refined flour. Meanwhile, the bran, the germ, and a small amount of the endosperm are collected as the coarse fraction. Using current technology, 85% of the coarse fraction particles are too large to pass through a 149 micron (U.S. wire 100 sieve). The coarse fraction is high in protein, vitamins, minerals, and phytonutrients. The coarse fraction typically includes a high microbial load which may further limit the use in food products. Thus, the coarse fraction is generally considered to be a low value by-product, which tends to be used as animal feed. In some milling processes, a portion of the germ is separated and used in food or as an oil source in dietary supplement and cosmetic applications. Typically, less than 25% of the germ is collected for these uses. Although the bran and the germ make up only about 18% of the wheat kernel by weight, they account for about 75% of the nutritional value of the wheat. The coarse fraction cannot readily be used in bakery and snack food applications due to the large particle size of the coarse fraction. Use of the coarse fraction in such applications is limited due to the effects of the coarse fraction on the product's texture and appearance. Currently, the coarse fraction is used in low levels in certain baking and snack food applications, primarily to give a healthier appearance to the products.

Traditionally, whole-grain wheat flour products are not as finely milled as refined wheat flour products. In order to produce ultrafine whole-grain wheat flour using a traditional milling flowsheet, further processing of the coarse fraction is required. A multiple pass hammermilling system that would include an intermediate method for sifting the ground product is required to reduce the coarse fraction to a particle size equivalent to that of refined wheat flour. The current technology, which would use hammermills to reduce the coarse fraction for production of ultrafine whole-grain wheat flour, has a low capacity and a high energy usage per ton of product.

Attempts have been made to produce ultrafine whole-grain wheat products, however, these attempts generally were not economically feasible and generally not accepted by the industry. The processes relied on reducing millfeed (coarse fraction) particle size using traditional grinding methods such as rollermills, hammermills, and bran slicers, which cannot economically or efficiently reduce the coarse fraction particles to the ultrafine granulation required. The process is currently uneconomical due to the high amount of energy usage and capitalization, which is required to grind the coarse fraction using the rollermills, hammermills and bran slicers. Hammermills, rollermills and bran slicers reduce the particle size of the millfeed, (coarse fraction), by using shear and impact as the primary mode of reduction rather than the more efficient method of particle on particle attrition. This is an inefficient way to grind these portions of the wheat kernel.

A typical whole-grain wheat flourmill does not produce whole-grain wheat flour with a particle size comparable to refined wheat flour. Using current technology, the finest granulation of whole-grain wheat flour that is available in the marketplace has a particle size of only 60% through a U.S. Wire 100 sieve. Thus, whole-grain wheat flour is coarse in appearance and is generally unattractive to consumers who prefer to eat refined wheat products, and is also less functional for the baker.

A mill flowsheet is a map of the milling process. The traditional whole-grain wheat flourmill flowsheet is only capable of producing a few types of granular whole-grain flour products, FIG. 3. As such, traditional whole-grain wheat milling technology is not able to achieve adequate particle size reduction to produce whole-grain wheat flour that has similar baking attributes to refined wheat flour.

What is needed is a way to enhance the nutritional value of popular bakery, snack, and food products by utilizing whole-grain wheat flour, while retaining the baking attributes and the "look and feel" of a typical refined wheat flour, thereby producing more palatable whole-grain wheat products for consumers. The process should produce an ultrafine-milled whole-grain wheat flour using the entire wheat kernel, that will allow food product developers to use a higher percentage of whole-grain wheat flour in their bakery, snack, and food products in order to enhance the finished product's nutritional value. The process should yield an ultrafine-milled whole-grain wheat flour which includes the entire wheat kernel. Thus, the ultrafine-milled whole-grain wheat flour will contain all the nutrients found-in the wheat kernel.

The ultrafine-milled whole-grain wheat flour should be able to replace refined wheat flour in traditional bakery and snack products, such as breads, bagels, muffins, waffles, pizza crusts, cookies, crackers, bakery mixes, fruit and grain bars, tortillas, brownies, pastries, pie crusts, cakes, quickbreads, sweet rolls, donuts, microwavable snack products, snack chips, par-baked bakery products, and extruded snacks in order to enhance the nutritional value of the products that contain the flour. The ultrafine-milled whole grain wheat flour should also replace refined wheat flour in food products such as pastas, ready-to-eat cereals, ready-to-drink beverages, instant beverages, meat extenders, meat (vegetarian) substitutes, nutritional bars, confectionaries, seasoning blends, gravy and sauce mixes, soup mixes, roux, coatings or breadings, cookie dough or other ice cream inclusions, and various other applications. The texture of the bakery products, snack products, and food products made with the ultrafine-milled whole-grain wheat flour should be the same as if refined wheat flour was used. The appearance of such bakery, snack, and food products will be more similar to products made with refined wheat flour.

Additionally an ultrafine-milled coarse fraction, which can be used in baking, snack, and food products to enhance the nutritional value of such products is required. The ultrafine-milled coarse fraction should be able to replace up to 100% of refined or whole-grain wheat flour in a variety of bakery, snack, and food products. It would also be advantageous to have an ultrafine-milled coarse fraction having a lower microbial load and a higher antioxidant capacity for use in baked goods, snack products, and food products.

SUMMARY OF INVENTION

The present invention relates to a process for manufacturing ultrafine-milled whole-grain wheat flour and the products thereof. Ultrafine is defined as having a particle size of less than or equal to about 150 µm. The invention further relates to the ultrafine-milled coarse fraction, which is made using the process of the invention and products which use the ultrafine-milled coarse fraction. The invention specifically relates to bakery, snack, and food products which use the ultrafine-milled coarse fraction to replace refined wheat flour. Such products include pastas, ready-to-eat cereals, microwavable snack products, par-baked bakery products, bakery mixes, breads, bagels, muffins, waffles, pizza crusts, cookies, pastries, pie crusts, tortillas, brownies, cakes, quickbreads, sweet rolls, donuts, ready-to-drink beverages, instant beverages, meat extenders, meat (vegetarian) substitutes, nutritional bars, fruit and grain bars, confectionaries, seasoning blends, gravy and sauce mixes, soup mixes, roux, extruded snacks, coatings or breadings, cookie dough or other ice cream inclusions, and various other applications. The ultrafine-milled coarse fraction can be used to replace the refined wheat flour or whole wheat flour in any application.

The process is a continuous flow grain milling process, including the steps of separating a quantity of cleaned and tempered wheat kernels into a fine fraction comprised primarily of endosperm along with small amounts of residual bran and germ and a coarse fraction comprised of bran, germ, and a small amount of residual endosperm. The coarse fraction is ground through a mill, such as a gap mill, to form an ultrafine-milled coarse fraction having a particle size of less than or equal to about 150 µm. The ultrafine-milled coarse fraction can be used to replace refined wheat flour in a variety of products. The ultrafine-milled coarse fraction can also be mixed with the fine fraction in order to form ultrafine-milled whole-grain wheat flour. The advantage of this is that the flour has the full nutritional value of wheat kernels, while retaining the texture of refined wheat flour and an appearance similar to refined wheat flour. Thus, the flour can be used in food products such as bakery products and snack food products, which typically use refined wheat flour. A further advantage of the process is that the ultrafine-milled coarse fraction has a lower microbial load than that found in standard coarse fractions. Finally, the ultrafine-milled coarse fraction has an antioxidant capacity that is about three times greater than refined wheat flour, FIGS. 16a and 16b.

Thus, the current invention discloses a three-in-one process for making refined wheat flour, an ultrafine-milled coarse fraction, and an ultrafine-milled whole-grain wheat flour. The three-in-one process includes ultrafine-milling the entire wheat kernel. The first product of the three-in-one process is refined wheat flour. The refined wheat flour is identical to the refined wheat flour currently on the market. The second product is the ultrafine-milled coarse fraction of the current invention, which can be used to replace the refined wheat flour in products to increase the nutritional value of the products. Finally, the third product, the ultrafine-milled whole-grain wheat flour, is made by mixing the ultrafine-milled coarse fraction with the fine fraction, resulting in an ultrafine-milled whole-grain wheat flour having high nutritional value. The three-in-one process can be used with any type of grain that can be milled.

The ultrafine-milled coarse fraction has a particle size which is about less than or equal to refined wheat flour. It has a fine texture similar to refined wheat flour with no visible bran specks and a slightly darker color. Thus, it can be used in baking, snack, food, and cereal applications, such as breads, bagels, pizza crust, tortillas, brownies, waffles, pastries, pie crusts, snack chips, muffins, cookies, crackers, bakery mixes, fruit and grain bars, pastas, microwavable snack products, par-baked bakery products, cakes, quickbreads, sweet rolls, donuts, ready-to-drink beverages, instant beverages, meat extenders, meat (vegetarian) substitutes, nutritional bars, ready-to-eat cereal, confectionaries, seasoning blends, gravy and sauce mixes, soup mixes, roux, extruded snacks, coatings or breadings, cookie dough or other ice cream inclusions, and various other applications. The ultrafine-milled coarse fraction is nutrient dense and high in fiber. The fiber content of the ultrafine-milled coarse fraction is about 38 to 40% total dietary fiber. Meanwhile the ultrafine-milled coarse fraction has 25% or less starch. The high fiber along with the lowered starch content yields a flour product that is naturally lower in available carbohydrates. The high fiber in the ultrafine-milled coarse fraction means it has a lower calorie density than refined wheat flour. The calorie density is lower due to the increase in the amount of insoluble fiber and the higher water retention compared to refined wheat flour, which lowers the caloric density, especially in baked products. Further, the ultrafine-milled coarse fraction contains at least 18% protein and is a source of phenolic phytonutrients, such as flavonoids, which are important antioxidants, thus increasing the antioxidant capacity of the ultrafine-milled coarse fraction.

In addition, a process for fortifying a refined wheat flour is also disclosed, which includes mixing an amount of refined wheat flour with an amount of the ultrafine-milled coarse fraction having a particle size distribution less than or equal to about 150 μm. By mixing the refined wheat flour with the ultrafine-milled coarse fraction, an ultrafine-milled wheat flour product is produced, which contains more nutrients than refined wheat flour and could be used to replace the refined wheat flour in breads, brownies, muffins, waffles, pizza crust, bagels, cookies, crackers, bakery mixes, fruit and grain bars, pastries, pie crusts, tortillas, ready-to-eat cereal, pastas, microwavable snack products, par-baked bakery products, cakes, quickbreads, sweet rolls, donuts, ready-to-drink beverages, instant beverages, meat extenders, meat (vegetarian) substitutes, nutritional bars, confectionaries, seasoning blends, gravy and sauce mixes, soup mixes, roux, extruded snacks, snack chips, coatings or breadings, cookie dough or other ice cream inclusions, and various other applications.

In breads, a percentage of the refined wheat flour is replaced by the ultrafine-milled wheat flour product. Replacing between about 20% and about 25% of the refined wheat flour with the ultrafine-milled coarse fraction yields products having the qualities associated with the use of refined wheat flour and the nutritional value of whole wheat-grain flour. In certain food applications by replacing higher percentages of the refined wheat flour with the ultrafine-milled coarse fraction, the texture, and appearance of the product is quite similar to refined wheat flour while the nutritional value increases, producing products that are nutritionally enhanced beyond whole-grain wheat flour. Although any variety of wheat will work in these applications, using white wheat varieties rather than red wheat varieties will yield a product more similar in appearance to products made with refined wheat flour due to the light color of the bran in white wheat varieties.

The present invention also includes the products of the process, bakery products made from the product of the process, snack products made from the product of the process, and a variety of other food products made from the product of the process.

The process yields a refined wheat flour, an ultrafine-milled coarse fraction which can be used to replace a percentage of refined flour or whole-grain wheat flour, and an ultrafine-milled whole-grain wheat flour which has the nutritional composition of whole-grain wheat flour while retaining a texture similar to refined wheat flour and an appearance more similar to refined wheat flour. The ultrafine-milled whole-grain wheat flour is derived from the entire wheat berry. In contrast, the ultrafine-milled coarse fraction is comprised primarily of the bran and germ of the wheat berry. The ultrafine-milled whole-grain wheat flour and the ultrafine-milled coarse fraction can be used for any application that uses refined wheat flour or whole-grain wheat flour.

BRIEF DESCRIPTION OF DRAWINGS

FIG. 2 is a table comparing the nutritional content of refined wheat flour and whole-grain wheat flour, the amount of total carbohydrates is determined by a proximate analysis, the percentage of protein, fat, ash, and moisture is determined and subtracted from 100, the result is considered the percentage of total carbohydrates, however, the percentage of total dietary fiber is an actual measurement;

FIG. 7 is a table listing the particle size distributions for a fine fraction (refined wheat flour), an ultrafine-milled coarse fraction, and an ultrafine-milled whole-grain wheat flour;

FIG. 8 is a table listing the nutritional data of refined wheat flour, versus ultrafine-milled whole grain wheat flour and ultrafine-milled coarse fraction;

FIG. 9 is a table listing the amounts of each ingredient for four different brownie formulas replacing varying amounts of refined wheat flour with ultrafine-milled coarse fraction;

FIG. 10 is a table listing the amounts of each ingredient for five different apple cinnamon muffin formulas replacing varying amounts of refined wheat flour with ultrafine-milled coarse fraction;

FIG. 11 is a table listing the amounts of each ingredient for three different chocolate chip cookie formulas replacing varying amounts of refined wheat flour with ultrafine-milled coarse fraction;

FIG. 12 is a table listing the amounts of each ingredient for two different whole wheat bread formulas replacing varying amounts of refined wheat flour with ultrafine-milled coarse fraction;

FIG. 13 is a table listing the amounts of each ingredient for a tortilla formula replacing an amount of refined wheat flour with ultrafine-milled coarse fraction;

FIG. 14 is a table listing the amounts of each ingredient for two different crisped cereal formulas replacing varying amounts of long grain rice flour with ultrafine-milled coarse fraction;

FIG. 15 is a table listing the amounts of each ingredient for four different pasta formulas replacing varying amounts of durum semolina with ultrafine-milled whole-grain wheat flour and ultrafine-milled coarse fraction;

FIG. 16 is a table listing the antioxidant capacity of wheat fractions; FIG. 16a lists the antioxidant capacity of wheat milling fractions; FIG. 16b is a comparison of the antioxidant capacity of wheat fractions versus fruits and vegetables; and, FIG. 17 is a table listing the microbiological load results for ultrafine-milled whole-grain wheat flour, coarse fraction and ultrafine-milled coarse fraction flour.

DETAILED DESCRIPTION

Figure 1:
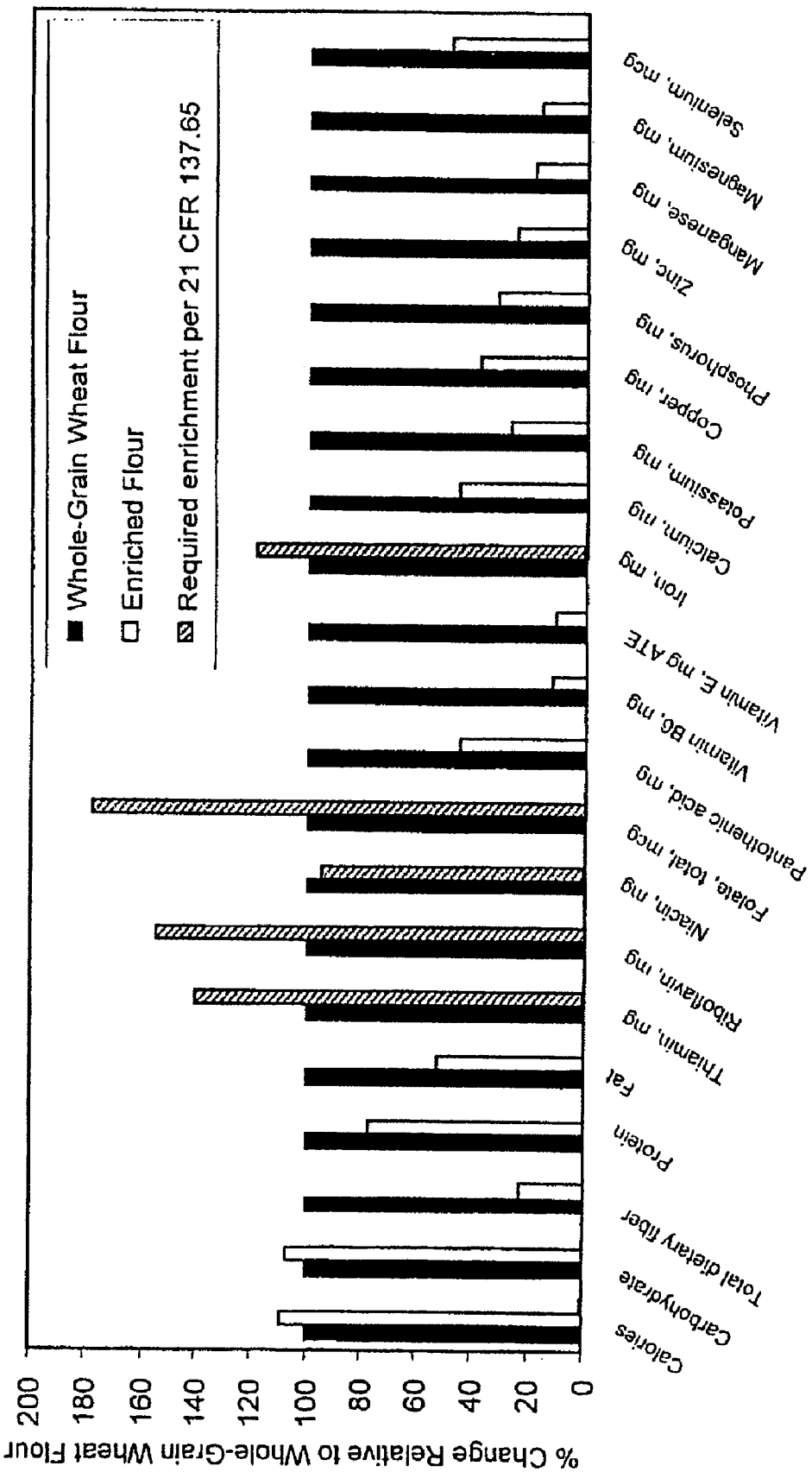
FIG. 1 is a bar graph nutritional comparison of refined wheat flour and whole-grain wheat flour.

The present invention relates to a process of producing an ultrafine-milled whole-grain wheat flour and the products thereof. The preferred process is a continuous flow grain milling process, whereby the process begins by providing or obtaining a quantity of wheat. The wheat is milled to produce a fine fraction formed primarily of endosperm and a coarse fraction formed primarily of bran and germ. The two fractions are milled to produce fractions having particle sizes less than or equal to about 150 μm. In particular, an ultrafine-milled coarse fraction is made that does not have visible bran specks and has a particle size of less than or equal to about 150 μm. The two fractions can be combined to form an ultrafine-milled whole-grain wheat flour comprised of the entire wheat berry. It is preferred if a gap mill is used to mill the coarse fraction during processing. Notably, the use of the disclosed process lowers the microbial load of the coarse fraction, making it even more beneficial for use with refined wheat flour, since the nutritional value of the flour is increased reducing the microbial load. Further, use of the ultrafine-milled coarse fraction increases the antioxidant capacity of the ultrafine-milled whole wheat flour when compared to refined wheat flour. The ultrafine-milled coarse fraction can also be used to fortify refined wheat flour in a variety of baked goods, snack products, and food products and as a replacement for refined or whole-grain wheat flour in any application that uses refined or whole-grain wheat flour.

For milling purposes, the wheat kernel is divided into three general anatomical regions. The bran is made up of the outer protective layers, which comprise about 14% of the kernel by weight and is high in fiber and ash (mineral) content. The germ is the embryonic wheat plant and comprises about 2-3% of the wheat kernel. The germ contains a high percentage of the lipids and essential nutrients found in the wheat kernel. The endosperm is the starchy inner portion of the wheat kernel that provides the energy for the developing wheat plant. The endosperm is characterized by its high starch and moderately high protein (i.e., gluten) content. The majority of the wheat kernel is comprised of the endosperm. The endosperm is the primary constituent in refined wheat flour.

Wheat milling is a mechanical method of breaking open the wheat kernel to separate as much endosperm as possible from the bran and germ and to grind the endosperm into flour. The process substantially separates the major components of wheat from one another. Refined wheat flour is produced when most of the bran and germ are separated from the endosperm. Typically, the yield of the endosperm, or refined wheat flour from the milling process, is between 70-80% of the total wheat processed. The remaining endosperm is still present in the coarse fraction. The typical yield of the current invention is between about 97% to about 100% of the entire wheat kernel, dependent on moisture loss due to processing.

After obtaining a quantity of wheat, the kernels are cleaned, and tempered. The tempered wheat is then held for a period of approximately 8 to 24 hours to allow the moisture to equilibrate within the wheat kernels. The tempered wheat is then processed through a series of rollermills, sifters and purifiers in order to separate the endosperm from the bran and germ. Once separated from the bran and the germ, the endosperm is ground to a particle size of less than or equal to about 150 μm. The bran and germ are removed and collected as part of the coarse fraction. The coarse fraction is comprised of bran, germ, and a small amount of residual endosperm.

Figure 3:
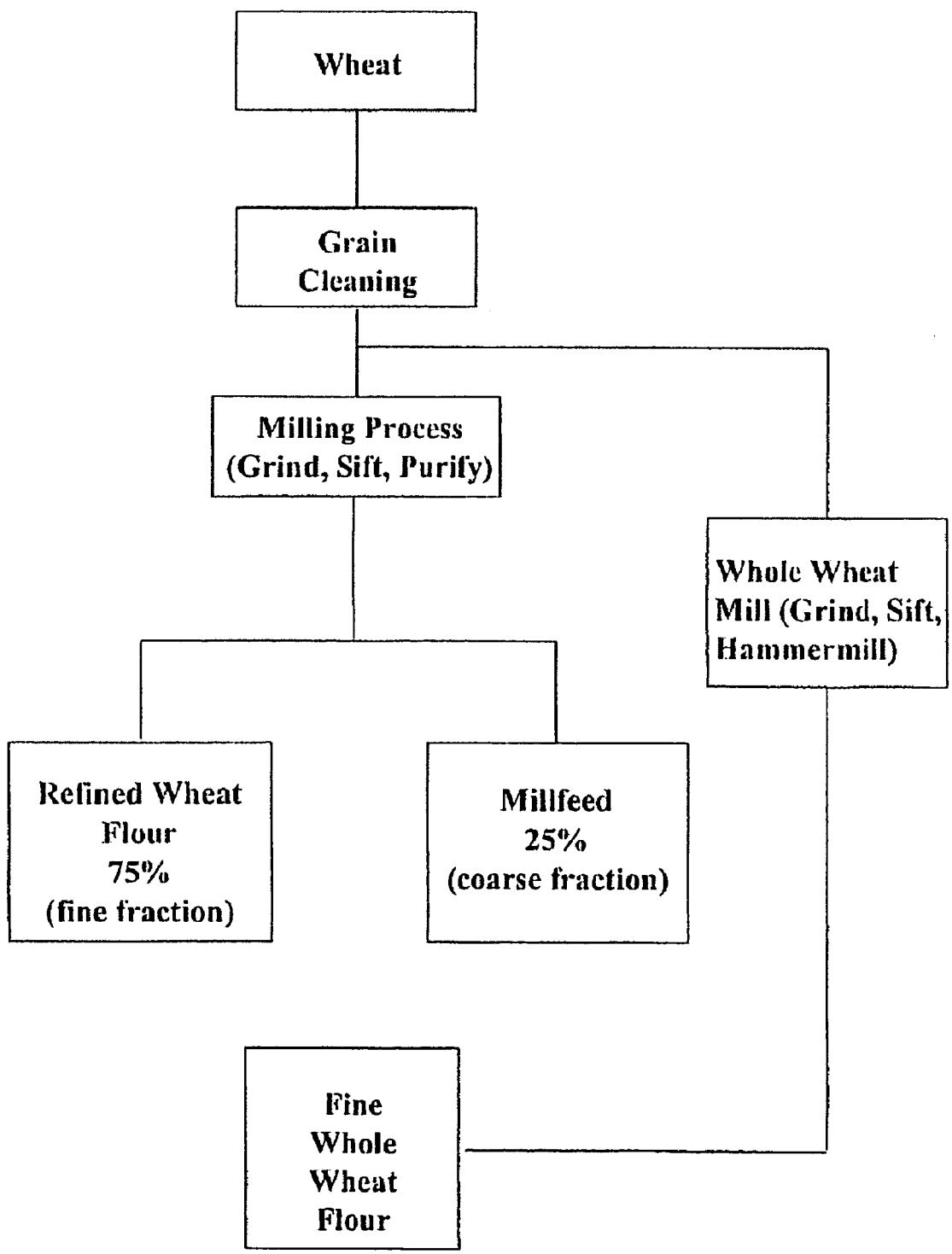
FIG. 3 is a flow chart of a traditional refined wheat flour milling process and a traditional whole wheat milling process.

In traditional milling methods the wheat is gathered, cleaned and tempered and then ground in order to form refined wheat flour and millfeed (coarse fraction), as shown in FIG. 3. The first step in this process, cleaning the wheat, includes removing various impurities such as weed seeds, stones, mud-balls, and other foreign materials, from the wheat. The cleaning of the wheat typically begins by using a separator in which vibrating screens are used to removes bits of wood and straw and anything else that is too big or too small to be wheat. Next, an aspirator is used, which relies on air currents to remove dust and lighter impurities. Then a destoner is used to separate the heavy contaminants such as stones that are the same size as wheat. Air is drawn through a bed of wheat on an oscillating deck that is covered with a woven wire cloth. A separation is made based on the difference in specific gravity and surface friction. The wheat then passes through a series of disc or cylinder separators which separate based on shape and length, rejecting contaminants that are longer, shorter, rounder or more angular than a typical wheat kernel. Finally, a scourer removes a small portion of the bran layer, crease dirt, and other smaller impurities.

Once the wheat is cleaned, it is tempered in order to be conditioned for milling. Moisture is added to the wheat kernel in order to toughen the bran layers while mellowing the endosperm. Thus, the parts of the wheat kernel are easier to separate and tend to separate more easily. Prior to milling, the tempered wheat is stored for a period of 8 to 24 hours to allow the moisture to fully absorb into the wheat kernel. The milling process is basically a gradual reduction of the wheat kernels. The grinding process produces a mixture of granulites containing bran and endosperm, which is sized by using sifters and purifiers. The coarse particles of endosperm are then ground into flour by a series of rollermills. When milling wheat, the wheat kernel typically yields 75% refined wheat flour (fine fraction) and 25% coarse fraction. The coarse fraction is that portion of the wheat kernel which is not processed into refined wheat flour, typically including the bran, germ, and small amounts of residual endosperm.

Figure 4:
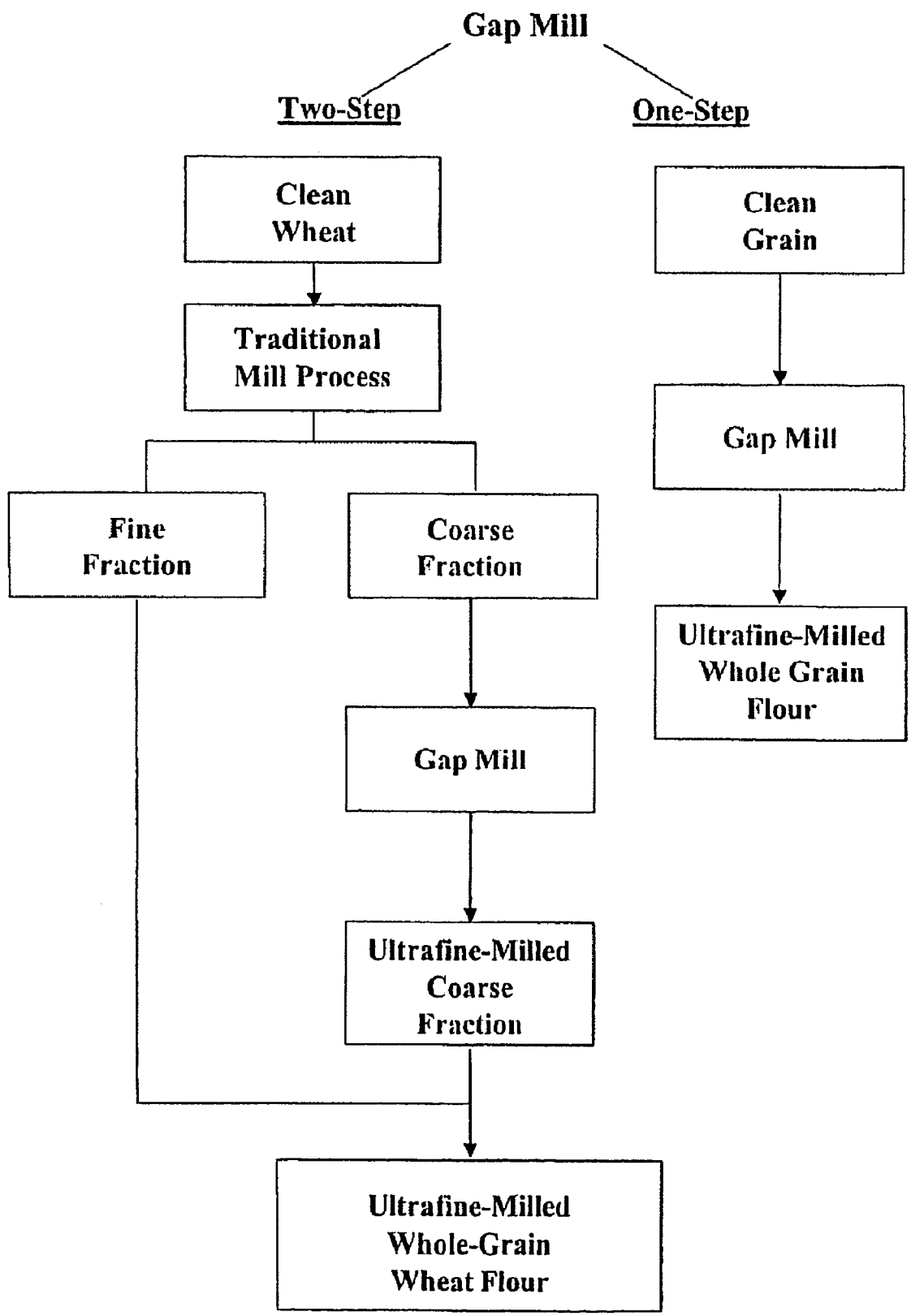
FIG. 4 is a flow chart of the gap milling process of the current invention, illustrating the one-step and two-step processes.

The recovered coarse fraction is then ground through a grinder, preferably a gap mill, to form an ultrafine-milled coarse fraction having a particle size distribution less than or equal to about 150 μm, FIG. 4. The gap mill tip speed normally operates between 115 m/s to 130 m/s. The high tip speed of the gap mill generates heat in the process. The heat generated during the process and the increased airflow leads to a decrease in the microbial load of the ultrafine-milled coarse fraction as shown in FIG. 17. Prior to grinding in the gap mill, the coarse fraction had an average aerobic plate count of 95000 colony forming units/gram (cfu/g) and an average coliforms of 1200 cfu/g. After passing through the gap mill the ultrafine-milled coarse fraction had an average aerobic plate count of 10000 cfu/g and an average coliforms of 900 cfu/g. Thus, the microbial load is noticeably decreased in the ultrafine-milled coarse fraction. The decrease is due to the heat and airflow generated in the process. After sifting, any ground coarse fraction having a particle size greater than 150 µm can be returned to the process for further milling.

Figure 6:
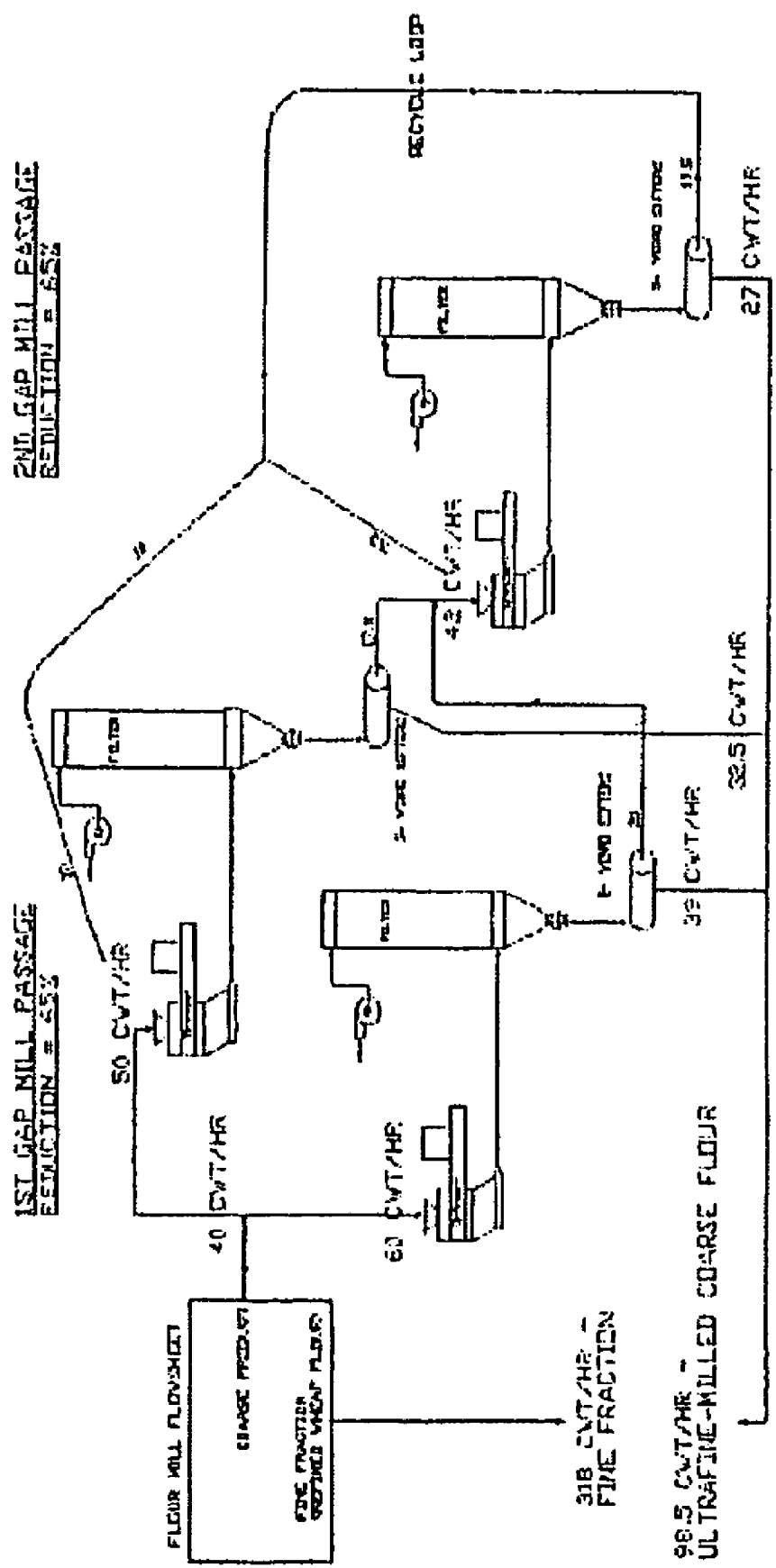
FIG. 6 is a detailed flowsheet of the high capacity gap mill process, illustrating the two passage gap mills including the recycling process of the current invention.

The high capacity process begins as shown in the flowsheet set forth in FIG. 6. After the fine fraction (refined wheat flour) and the coarse fraction (coarse product) have been separated, the coarse fraction is divided and each portion of the coarse fraction is sent through a separate grinder. The coarse fraction is divided and sent to two different gap mills in order to increase the capacity of the system. The grinder is preferably a gap mill. The use of a gap mill is preferred to other types of mills because the design of the gap mill allows the particles of the coarse fraction to collide with each other, generating particle on particle attrition, thereby further breaking the particles down into smaller particle sizes. As previously noted, the gap mill generates heat during the process. The heat generated by the gap mill, along with the airflow in the system lead to less moisture in the ultrafine-milled coarse fraction. The loss of moisture is believed to have the added advantage of decreasing the microbial load of the ultrafine-milled coarse fraction, FIG. 17. The gap mill is preferably a Bauermeister Gap Mill (Bauermeister, Inc., Memphis, Tenn.). The Bauermeister gap mill is the most efficient because it is designed for fine grinding and includes an adjustable grinding gap between a conical shaped rotor and a corrugated baffle. This results in a higher level of particle reduction as compared to other gap mills. The coarse fraction is continuously conveyed from the flourmill to the inlet of the two first passage gap mills at an approximate rate of 10,000 pounds per hour (#/hr). The ground coarse fraction is then discharged out of the bottom of the gap mill by gravity, into an airflow and pneumatically conveyed to a filter.

The ground coarse fraction exits the gap mill by means of a 5000 cfm (approximate airflow) negative pressure lift. The ground coarse fraction is separated from the air stream by a filter, which discharges into a Vibro Sifter. The Vibro Sifter separates the ground coarse fraction by using centrifugal and vibratory force to sift the ground coarse fraction. The material passing through the screen is the ultrafine-milled coarse fraction having a particle size of less than or equal to about 150 µm and thus requires no further processing. The ground coarse fraction passing over the screen has too large of a particle size and requires additional particle reduction. This ground coarse fraction flows to the second passage gap mill. Once it is passed through, the second passage gap mill, the ground coarse fraction is conveyed by means of a 5000 cfm (approximate airflow) negative pressure lift. The ground coarse fraction is separated from the air stream by a filter, which discharges into a Vibro Sifter. The ground coarse fraction is sifted using a Vibro Sifter to ensure a particle size of less than or equal to about 150 µm in the finished product, the ultrafine-milled coarse fraction. The ground coarse fraction passing over the Vibro Sifter screen has too large of a particle size and requires additional particle reduction. This portion of the ground coarse fraction is directed back to the inlets of the first passage and second passage gap mills for further processing. The resulting product is the ultrafine-milled coarse fraction which has a decreased microbial load as compared to the coarse fraction, FIG. 17. The ultrafine-milled coarse fraction can then be mixed with the fine fraction to form the ultrafine-milled whole-grain wheat flour, thus increasing the nutritional value, the fiber content, and the antioxidant capacity of the product compared to refined wheat flour. The ultrafine-milled coarse fraction can also be used in various amounts to replace refined or whole-grain wheat flour in baked goods, snack products, and food products.

The antioxidant capacity of the ultrafine-milled coarse fraction (7,400 µmole TE/100 g) is comparable to the antioxidant capacity of wheat germ (8,400 µmole TE/100 g), and about three times greater than the average antioxidant capacity of refined wheat flour (1,450 µmole TE/100 g), FIG. 16a. Compared to the endosperm, the amount of antioxidants in the germ and bran portions of the wheat kernel are substantially higher as evidenced by the total antioxidant capacity, as shown in FIG. 16a. The coarse fraction, prior to being processed through the gap mill has an antioxidant capacity of 6,700 µmole TE/100 g. While the ultrafine-milled whole wheat flour has an antioxidant capacity of 2,800 µmole TE/100 g. Use of the ultrafine-milled coarse fraction in bakery, snack, and food products can greatly increase the antioxidant capacity of the products.

When compared on an equal weight basis with various fruits and vegetables, the antioxidant capacity of the ultrafine-milled coarse fraction is greater than blueberries, raisins, strawberries, spinach, broccoli and tomatoes. Of the fruits and vegetables tested, only artichokes and dried plums had a higher antioxidant capacity, FIG. 16b. The increase in the antioxidant capacity of the ultrafine-milled coarse fraction versus the coarse fraction is due to the lower moisture content of the ultrafine-milled coarse fraction.

Products made with ultrafine-milled coarse fraction have the benefit of higher fiber, protein, lipids, vitamins, minerals and phytonutrient levels compared to products made from refined wheat flour. The higher fiber yields products having a lower calorie density due to the increased amounts of insoluble fiber. Further, in many baked products, calorie density is lowered due to the higher water absorption/retention of the fiber as compared to refined wheat flour. Replacing about 24% of the refined wheat flour with the ultrafine-milled coarse fraction in baked goods, snack products, and food products yields a product having a texture and appearance more similar to 100% refined wheat flour products but with the nutritional value of whole-grain wheat. While any variety of wheat can be used in the application the use of white wheat varities yield a product appearance more similar to products made with refined wheat flour, since white wheat has a lighter colored bran. Nutritional value includes the amount of fiber, protein, lipids, vitamins, minerals and phytonutrients present in a product. Further, by replacing greater amounts of refined or whole-grain wheat flour with the ultrafine-milled coarse fraction, the products can actually have greater nutritional value than products manufactured with whole-grain wheat. Thus, the product will have higher fiber, vitamin and mineral contents and phytonutrients than refined or whole-grain wheat products.

Therefore, the process can yield up to three separate products. The first product is refined wheat flour, comprised of the fine fraction, which contains primarily the endosperm of the wheat kernel along with residual amounts of bran and germ. This fraction typically has a particle size distribution of less than or equal to about 150 µm. According to FDA standards, the refined wheat flour product must have a particle size in which not less than 98% passes through a U.S. Wire 70 sieve. Thus, in order to meet FDA standards, the particle size distribution must be less than or equal to 212 μm for refined wheat flour. The refined wheat flour is typically comprised of about 10-11% protein, about 1% fat, about 76% total carbohydrates, which includes about 2.5-3% dietary fiber, and about 0.5% ash (minerals), FIG. 8.

The second product is the ultrafine-milled coarse fraction. This is the coarse fraction which has been processed through the gap mill and has a particle size distribution less than or equal to about 150 μm. This ultrafine-milled coarse fraction contains about 20% protein, about 7% fat, about 60% total carbohydrates, including about 40% dietary fiber. The ash (mineral) content of the ultrafine-milled coarse fraction is about 6%, FIG. 8. The ultrafine-milled coarse fraction has a decreased microbial load due to the increased heat and airflow generated by the process. The ultrafine-milled coarse fraction can be sold to consumers and used to replace a percentage of refined or whole-grain wheat flour used in product formulas in order to increase the fiber content, antioxidant capacity, and overall nutritional value of the product.

The third product is an ultrafine-milled whole-grain wheat flour. This flour has a particle size distribution of less or equal to about 150 μm. Due to the particle size distribution and the nutritional value of the ultrafine-milled whole-grain wheat flour, it can replace refined wheat flour or whole-grain wheat flour in any food products currently made with these flours. The nutritional composition of this ultrafine-milled whole-grain wheat flour is identical to that of whole-grain wheat flour, FIG. 8. The ultrafine-milled whole-grain wheat flour contains about 13-14% protein, about 2% fat, about 2% ash (minerals), and about 73% total carbohydrates, including about 12% total dietary fiber. Thus, the ultrafine-milled whole-grain wheat flour as compared to the ultrafine-milled coarse fraction contains less protein, fiber, vitamins, minerals, and phytonutrients, FIG. 8. This is expected since the ultrafine-milled whole grain wheat flour is comprised of the fine fraction, which is the refined wheat flour, mixed with the ultrafine-milled coarse fraction, which is comprised of the bran and germ. Since the fine fraction and the ultrafine-milled coarse fraction are combined to form the ultrafine-milled whole-grain wheat flour after each fraction has been milled to a particle size distribution of less than or equal to about 150 μm, the ultrafine-milled whole-grain wheat flour is considered to be a pre-mixed wheat flour composition when the two fractions first contact each other, prior to the fractions being blended. Once the two fractions contact each other, the fractions are blended to form the ultrafine-milled whole-grain wheat flour. The ultrafine-milled whole-grain wheat flour has a texture identical to refined wheat flour and a color that is more similar to refined wheat flour. Therefore, the ultrafine-milled whole-grain wheat flour can be used in any food product that currently includes refined or whole-grain wheat flour. The food products include pastas, ready-to-eat cereal, microwavable snack products, par-baked bakery products, bakery mixes, cakes, quickbreads, sweet rolls, donuts, ready-to-drink beverages, instant beverages, meat extenders, meat (vegetarian) substitutes, nutritional bars, fruit and grain bars, confectionaries, seasoning blends, gravy and sauce mixes, soup mixes, roux, extruded snacks, coatings or breadings, cookie dough or other ice cream inclusions, and various other applications. A major benefit of the ultrafine-milled whole-grain wheat flour is that the texture and appearance are more similar to refined wheat flour while the nutritional value of the whole-grain wheat flour is added.

Another embodiment is a process for fortifying refined wheat flour. The process includes mixing an amount of refined wheat flour with an amount of ultrafine-milled coarse fraction having a particle size distribution less than or equal to about 150 μm to produce an ultrafine-milled wheat flour product. The ultrafine-milled wheat flour product contains more nutrients, antioxidants, and fiber than refined wheat flour and can be used for any bakery, snack and food products which currently use refined wheat flour or whole-grain wheat flour.

The ultrafine-milled course fraction can also be used to replace refined wheat flour in the preparation of commercial products. By replacing between 20%-25% of the refined wheat flour with the ultrafine-milled course fraction the nutritional value of the refined wheat flour products can be increased to levels equal to the nutritional value of products made from whole-grain wheat flour. Such replacement has minimal effect on the texture and appearance of the products. The nutritional value of the products can be enhanced beyond that of whole-grain wheat by replacing more than 25% of the refined wheat flour with the ultrafine-milled course fraction. The ultrafine-milled coarse fraction can be used to replace refined wheat flour or whole-grain wheat flour in numerous bakery, snack and food products such as pastas, ready-to-eat cereal, ready-to-drink beverages, instant beverages, meat extenders, meat (vegetarian) substitutes, nutritional bars, confectioneries, seasoning blends, gravy and sauce mixes, soup mixes, roux, coating, breadings, breads, bagels, brownies, muffins, waffles, pizza crusts, cookies, pastries, pie crusts, quickbreads, sweet rolls, donuts, baking mixes, tortillas, fruit and grain bars, par-baked bakery products, crackers, microwavable snack products, extruded snacks, and snack chips.

One embodiment involves using the ultrafine-milled whole-grain wheat flour or the ultrafine-milled course fraction as a meat extender. A meat extender is an ingredient, such as flour, used to increase the bulk of meat. Meat extenders can be used in the production of sausages, hotdogs, and other meat products. The ultrafine-milled whole-grain wheat flour or the ultrafine-milled coarse fraction can also be used as an extender in meatless versions of such products. The use of the ultrafine-milled whole-grain wheat flour or the ultrafine-milled course fraction as an extender in these products will enhance the nutritional value of the products. Further, such use offers the population another source of fiber, thereby helping to increase fiber intake to currently recommended levels.

The ultrafine-milled whole-grain wheat flour or the ultrafine-milled coarse fraction can also be used as extenders or thickeners in products such as seasoning blends, gravy and sauce mixes, soup mixes, and roux. Further the ultrafine-milled whole-grain wheat flour or the ultrafine-milled coarse fraction can be used in ready-to-drink beverages or instant beverages.

In a further embodiment, other grain products, such as corn, rye, barley, rice, oats, triticale, sorghum, millet, buckwheat, quinoa, amaranth, variants thereof, and mixtures thereof can be ground using the same process but at varying grinding capacities. Use of the process to grind these other grains yields ultrafine-milled whole grain flours made from about 100% of the grain. These ultrafine-milled grain flours can be used in the same applications as whole-grain flours, which are currently on the market. Therefore, the ultrafine grain flours can be used in breads, cereals, bakery, snack, and food products. The ultrafine-milled whole grain flours could also be marketed directly to consumers for use in their homemade baked products.

EXAMPLES

Example 1

A quantity of Platte hard white winter wheat was obtained and milled according to known milling procedures. The fine fraction and the coarse fraction are separated during the milling process. The fine fraction has a particle size of 1.4% coarser than a US 100 Wire (mesh size 149 μm), FIG. 7 (ref. 1270). Therefore, 98.6% of the fine fraction has a particle size distribution of less than or equal to 150 μm. Further sifting was done using a U.S. 200 Wire (74 μm), a U.S. 325 Wire (44 μm) and a U.S. 400 Wire (37 μm). Forty-seven percent of the fine fraction was left on the U.S. 200 Wire, indicating that 53% of the fine fraction has a particle size distribution of less than or equal to 74 μm. About 77% of the fine fraction was left on a U.S. 325 Wire, indicating that 23% of the fine fraction had a particle size distribution of less than or equal to 44 μm. Finally, 98% of the fine fraction was left on a U.S. 400 Wire, indicating that 2% of the fine fraction had a particle size of less than or equal to 37 μm.

Figure 5:
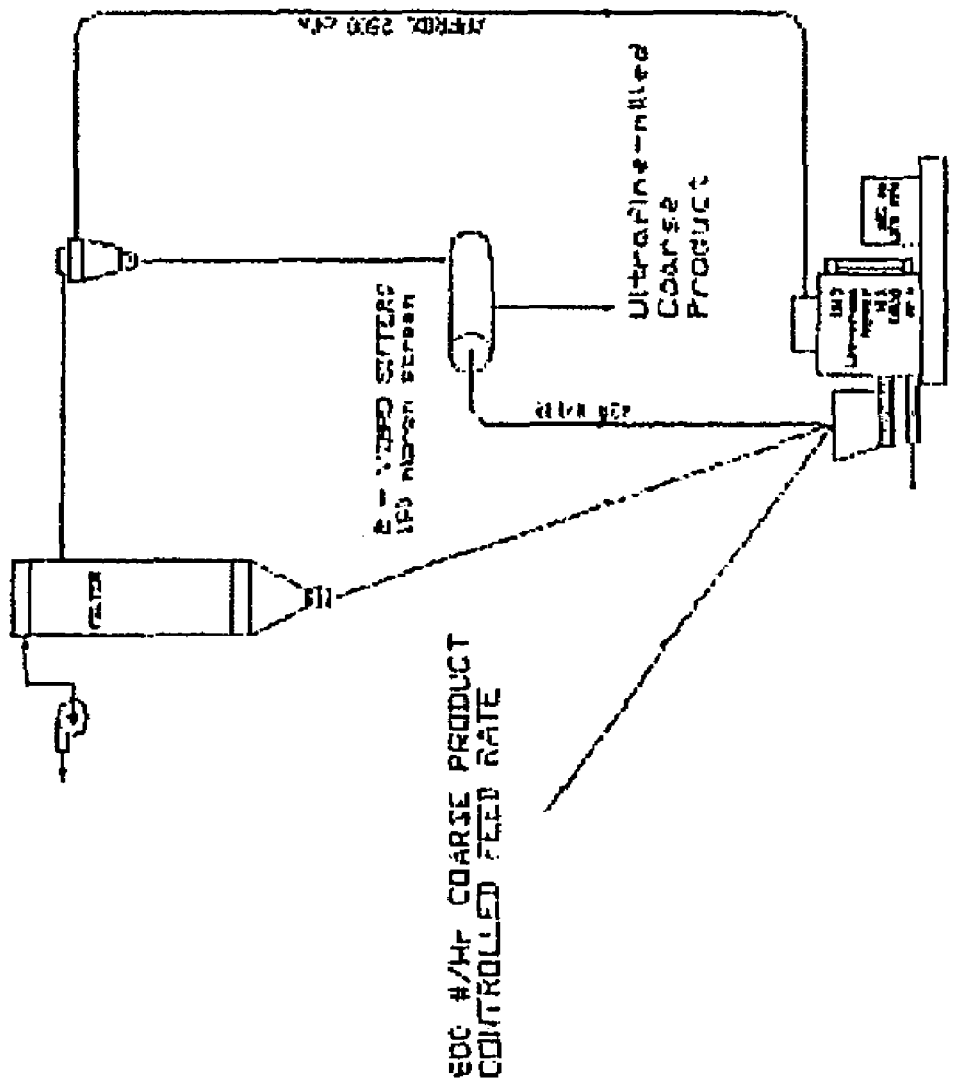
FIG. 5 is a detailed flowsheet of the gap mill process.

The coarse fraction was ground using a UMS Type FG1 Gap Mill, FIG. 5. After passing through the Gap Mill, 4.0% of the ultrafine-milled coarse fraction did not pass through a U.S. 100 Wire (mesh size 149 μm), as shown in reference 1269 of FIG. 7. Therefore, 96% of the ultrafine-milled coarse fraction has a particle size of less than or equal to 150 μm. About 46% of the ultrafine-milled coarse fraction was left on the U.S. 200 Wire, indicating that 54% of the ultrafine-milled coarse fraction has a particle size distribution of less than or equal to 75 μm. About 68% of the ultrafine-milled coarse fraction was left on the U.S. 325 Wire, indicating that 32% of the ultrafine-milled coarse fraction had a particle size distribution of less than or equal to 44 μm. Finally, about 99% of the ultrafine-milled coarse fraction was left on the U.S. 400 Wire, indicating that 1% of the ultrafine-milled coarse fraction had a particle size distribution of less than or equal to 37 μm, FIG. 7.

After blending the ultrafine-milled coarse fraction with the fine fraction, to form ultrafine-milled whole grain wheat flour, 2% of the ultrafine-milled whole grain wheat flour did not pass through a US 100 Wire (mesh size 149 μm), as shown in reference 1301 of FIG. 7. Therefore, about 98% of the fine fraction has a particle size distribution of less than or equal to 150 μm. Further sifting was done using a U.S. 200 Wire (74 μm), a U.S. 325 Wire (44 μm) and a U.S. 400 Wire (37 μm). Forty-eight percent of the fine fraction was left on the U.S. 200 Wire, indicating that 52% of the fine fraction has a particle size distribution of less than or equal to 74 μm. About 78% of the fine fraction was left on a U.S. 325 Wire, indicating that 22% of the fine fraction had a particle size distribution of less than or equal to 44 μm. Finally, 98% of the fine fraction was left on a U.S. 400 Wire, indicating that 2% of the fine fraction had a particle size of less than or equal to 37 μm.

Thus, the results, as shown in FIG. 7, indicate that the use of the gap mill on the coarse fraction yielded a product that had a particle size similar to the refined wheat flour. Based on these results, an ultrafine-milled whole-grain wheat flour has been produced which uses the entire wheat kernel and has all of the nutritional value of whole wheat flour while retaining the particle size distribution requirements of refined wheat flour.

Example 2

High Capacity Installation to Produce Ultrafine-milled Whole-grain Wheat Flour:

A typical flour mill flowsheet produces refined wheat flour (the fine fraction) and the coarse fraction. The coarse fraction will be conveyed continuously from the flour mill to two gap mills, FIG. 6. A first gap mill passage will use two machines with an estimated throughput of 110 cwt/hr (11000 hundred weight per hour). The flowsheet, FIG. 6, will reduce 100 cwt/hr of coarse fraction to the desired particle size. The ground coarse fraction will be conveyed from the gap mill by means of a 5000 cfm negative pressure pneumatic lift to a filter, designed to separate the air from the conveyed product without the use of a cyclone. The ground coarse fraction will exit the filter and be discharged into a Vibro Sifter. The Vibro Sifter will separate the ground coarse fraction by using centrifugal and vibratory force to sift the ground coarse fraction. The material passing through the Vibro Sifter screen will be the ultrafine-milled coarse fraction having a particle size distribution of less than or equal to 150 μm and will require no further processing. The first passage gap mill efficiency will reach 65% extraction. The ground coarse fraction from the gap mill passage having a particle size greater than 150 μm will be separated by the Vibro Sifter and directed to the second single gap mill for further reduction. The ground coarse fraction from the gap mill passage having a particle size greater than 150 μm will be conveyed continuously from the first gap mill Vibro Sifter to the second gap mill passage at an estimated rate of 38.5 cwt/hr. Approximately 13.5 cwt/hr of the ground coarse fraction will have a particle size greater than 150 μm and will be rejected by the second passage Vibro Sifter. The 13.5 cwt/hr of the ground coarse fraction having a particle size greater than 150 μm will enter a recycle loop to be reground on the first and second gap mill passages. Both ground coarse fractions will follow the process flow previously described for the first and second gap mill passages. Fifteen percent of the rejected second passage ground coarse fraction will return to the second passage gap mill and 85% of the second passage ground coarse fraction will return to the first passage gap mill. The grinding efficiency for the second gap mill passage will be less than the first gap mill passage grinding. The grinding efficiency of the second pass gap mill should be approximately 50%±5% through a 150 μm screen. System capacity will be limited to the grinding efficiency of the second passage gap mill. Once reduced, the ultrafine-milled coarse fraction and the fine fraction will be continuously blended together to produce the ultrafine-milled wholegrain wheat flour. The flour has the same nutritional value as whole-grain wheat flour and the texture and appearance similar to refined wheat flour, FIG. 5.

Example 3

High Capacity Installation to Produce an Ultrafine-milled Coarse Fraction:

The same procedure as disclosed in Example 1 will be followed, except the ultrafine-milled coarse fraction is the end product and will not be mixed with the fine fraction. The ultrafine-milled coarse fraction is higher in protein, fiber and other nutrients than either refined wheat flour or whole wheat flour, FIG. 5 while having a texture similar to refined wheat flour.

Example 4

Production of an Ultrafine-milled Whole Grain Product:

A wide variety of grain can be processed to produce ultrafine-milled whole grain products. The grain used can be any grain known in the art including corn, rye, barley, rice, oats, triticale, sorghum, millet, buckwheat, quinoa, amaranth, variants thereof, and mixtures thereof. The grain will be conveyed continuously to two gap mills, FIG. 6. A first gap mill passage with two machines will have an estimated throughput of 110 cwt/hr, but may vary due to the morphology and composition of the grain. The flowsheet, FIG. 6, will reduce 100 cwt/hr of grain to the desired particle size. The ground grain will be conveyed from the gap mill by means of a 5000 cfm negative pressure pneumatic lift to a filter, which is designed to separate the air from the ground grain without the use of a cyclone. The ground grain will exit the filter discharging into a Vibro Sifter. The Vibro Sifter will separate the ground grain by using centrifugal and vibratory force to sift the ground grain. The material passing through the screen is the ultrafine-milled grain product having a particle size distribution of less than or equal to 150 μm and will require no further processing. The first passage gap mill efficiency will reach about 79% extraction. The ground grain from the gap mill passage having a particle size greater than 150 μm will be separated by the Vibro Sifter and directed to the second single gap mill for further reduction. The ground grain having a particle size greater than 150 μm will be conveyed continuously from the first gap mill Vibro Sifter to the second gap mill passage at an estimated rate of about 24 cwt/hr. Approximately 12 cwt/hr of the ground grain is rejected by the second passage Vibro Sifter. The rejected ground grain will enter a recycle loop to be reground on the first and second gap mill passages. Both ground grain products will follow the process flow previously described for the first and second gap mill passages. Fifteen percent of the rejected second passage ground grain returns to the second passage gap mill and 85% of the rejected ground grain returns to the first passage gap mill. The grinding efficiency for the second gap mill passage will be less than the first gap mill passage grinding. The grinding efficiency of the second pass gap mill should be approximately 50%±5% through a 150 μm screen. System capacity will be limited to the grinding efficiency of the second passage gap mill. The ultrafine-milled whole grain flour will have the same nutritional value as the respective conventionally-milled whole-grain flour but with a finer texture.

Example 5

A quantity of Platte hard white winter wheat was obtained and milled according to known milling procedures. The fine fraction and the coarse fraction are separated during the milling process. The coarse fraction was ground using a UMS Type FG1 Gap Mill, FIG. 5. Prior to passing through the Gap Mill, the coarse fraction had an average aerobic plate count of 95000 CFU/g (Colony Forming Units per gram), and an average coliforms count of 1200 CFU/g, FIG. 17. After passing through the Gap Mill, the ultrafine-milled coarse fraction had an average aerobic plate count of 10000 CFU/g and an average coliforms count of 900 CFU/g, FIG. 17. Thus the overall microbial load values decreased when the coarse fraction was passed through the Gap Mill.

After blending the ultrafine-milled coarse fraction with the fine fraction, to form ultrafine-milled whole grain wheat flour, the ultrafine-milled whole grain wheat flour had an average aerobic plate count of 20000 CFU/g and an average coliforms count of 1165 CFU/g, FIG. 17.

Thus, the results, as shown in FIG. 17, indicate that the use of the gap mill on the coarse fraction yielded a product that had a decreased microbial load. Based on these results, an ultrafine-milled whole-grain wheat flour has been produced which uses the entire wheat kernel, has a decreased microbial load, and has all of the nutritional value of whole wheat flour while retaining the particle size distribution requirements of refined wheat flour.

Example 6

Brownies

Comparisons were made using the ultrafine-milled coarse fraction as flour in brownie formulas. Four separate brownie formulas were made. Brownie formula 1 used 100% of the flour as refined wheat flour and was considered the control. Brownie formula 2 replaced 24% of the refined wheat flour with ultrafine-milled coarse fraction. Brownie formula 3 replaced 50% of the refined wheat flour with the ultrafine-milled coarse fraction. Brownie formula 4 replaced 100% of the refined wheat flour with the ultrafine-milled coarse fraction. The brownie formulas also included granulated sugar, cocoa powder, salt, baking powder, butter, eggs, vanilla extract, chopped walnuts, and chopped pecans. The amounts of each ingredient are shown in FIG. 9.

The brownie formulas were prepared by blending the refined wheat flour, ultrafine-milled coarse fraction, sugar, baking powder, salt, and cocoa powder to form the dry ingredient mixture. Then, the butter was blended in, followed by the eggs and vanilla. The walnuts and pecans were stirred into the final batter mixture prior to pouring into a greased 8 inch square baking pan.

All of the brownie formulas were baked in a preheated oven at 375° F. for 30-35 minutes until done. The final cooking time was determined by viewing each brownie formula to determine when the brownie pulled away slightly from the sides of the pan, and a cake tester, inserted in the center of the pan of brownies, came out with crumbs adhering to it. Once this occurred the brownies were removed from the oven and cooled completely in the pan prior to cutting them into squares and testing to determine the properties of the individual brownie formulas.

Observations were that brownie formulas 3 and 4 containing 50:50 refined wheat flour:ultrafine-milled coarse fraction and 100:0 refined wheat flour:ultrafine-milled coarse fraction, respectively had a better consistency, appearance, taste, and overall structure as compared to brownie formulas 1 and 2 which used 100:0 refined wheat flour:ultrafine-milled coarse fraction and 76:24 refined wheat flour:ultrafine-milled coarse fraction, respectively. Brownie formula 1 had chewy edges and a runny interior. Brownie formula 2 had chewy edges and a slightly runny interior. By observing the four different formulas which replaced increasing amounts of the refined wheat flour with the ultrafine-milled coarse fraction, it was determined that brownies made by replacing between 50% and 100% of the refined wheat flour with the ultrafine-milled coarse fraction had excellent characteristics. Brownie formula 3 had the most optimal brownie characteristics with chewy edges and a moist, chewy interior.

Example 7

Apple Cinnamon Muffins

Five separate muffin formulas were produced, each replacing a different percentage of the refined wheat flour with the ultrafine-milled coarse fraction. Muffin formula 1 replaced 24% of the refined wheat flour with the ultrafine-milled coarse fraction. Muffin formula 2 replaced 50% of the refined wheat flour with the ultrafine-milled coarse fraction. Muffin formula 3 replaced 75% of the refined wheat flour with the ultrafine-milled coarse fraction. Muffin formulas 4 and 5 replaced 100% of the refined wheat flour with the ultrafine-milled coarse fraction. The difference in muffin formulas 4 and 5 was that some of the sugar, water and soybean oil in muffin formula 4 was replaced with unsweetened applesauce in muffin formula 5. The remaining ingredients of the apple cinnamon muffins included Sustagrain® whole-grain barley flakes, baking powder, salt, non-fat dry milk, granulated sugar, cinnamon, evaporated diced apples, dry whole eggs, water, soybean oil and unsweetened applesauce. The exact amounts of these various ingredients appear in FIG. 10.

The muffin formulas were prepared by blending the refined wheat flour, ultrafine-milled coarse fraction, Sustagrain® whole-grain barley flakes, baking powder, salt, non-fat, dry milk, sugar, cinnamon, evaporated diced apples and dry whole eggs together to form the dry ingredient mixture. Then the soybean oil, water, and unsweetened applesauce were mixed in until just incorporated.

The muffin batter was scaled into greased mini muffin pans at 18 grams per muffin cup and baked at 425° F. for 7 minutes. The baked muffins were cooled completely in the pan prior to removing the individual muffins and testing to determine the properties of each muffin formula.

By observing the different formulas which replaced increasing amounts of the refined wheat flour with the ultrafine-milled coarse fraction, it was determined that up to 100% of the refined wheat flour could be replaced with the ultrafine-milled coarse fraction to produce a muffin with good flavor, appearance and texture, but with improved nutritional value as compared to muffins made with 100% of the flour as refined wheat flour.

Example 8

Chocolate Chip Cookies

Three separate chocolate chip cookie formulas were made using various amounts of ultrafine-milled coarse fraction. Cookie formula 1 used 100% of the flour as refined wheat flour and was considered the control. Cookie formula 2 replaced 24% of the refined wheat flour with ultrafine-milled coarse fraction, while cookie formula 3 replaced 50% of the refined wheat flour with ultrafine-milled coarse fraction. The other ingredients in the cookies included light margarine, light brown sugar, granulated sugar, Egg Beaters®, vanilla extract, baking soda, baking powder, salt, instant coffee granules, and semi-sweet chocolate chips. The amounts of each ingredient used are listed in FIG. 11.

The chocolate chip cookie formulas were prepared by mixing the refined wheat flour, ultrafine-milled coarse fraction, baking soda, baking powder, salt, and instant coffee granules together to form the dry ingredient mixture. The margarine and sugars were creamed together. The Egg Beaters® and vanilla extract were blended into the creamed mixture. The dry ingredient mixture was blended into the wet ingredient mixture. The semisweet chocolate chips were folded into the final cookie dough mixture.

The cookie dough was portioned in 32-35 gram increments onto a greased cookie sheet and baked in a preheated oven at 350° F. for 10-15 minutes or until golden brown. The cookies were removed from the oven and cooled on a metal rack prior to testing to determine the properties of each cookie formula.

It was noted that using more of the ultrafine-milled coarse fraction and less of the refined wheat flour in combination with the light margarine yielded a cookie having good flavor, texture, and appearance and that did not spread excessively as is typical when light margarine is substituted for full fat margarine in a cookie formula.

Example 9

Bread

Three separate bread formulas were made using various amounts of ultrafine-milled coarse fraction. Bread formula 1 was the control formula and included 100% refined wheat flour and no ultrafine-milled coarse fraction. Bread formula 2 replaced 25% of the refined wheat flour with ultrafine-milled coarse fraction. Bread formula 3 replaced 50% of the flour with ultrafine-milled coarse fraction. The other ingredients in the bread included water, gluten, compressed yeast, soybean oil, sugar, sodium stearoyl lactylate, yeast food, salt, emulsifier, ascorbic acid, and azodicarbonamide solution. The amounts of each ingredient used are listed in FIG. 12.

All of the sponge ingredients were added to a mixing bowl. Using a dough hook attachment, the sponge ingredients were mixed on low speed for 1 to 2 minutes until ingredients were fully hydrated. The sponge was covered to prevent drying. The sponge was stored at room temperature for 3-4 hours. After the sponge was set, the remaining dry ingredients, water, yeast, and sponge were added to a mixing bowl. Using a dough hook attachment, the ingredients were mixed on low speed for 1 to 2 minutes until the ingredients were fully hydrated. Then the ingredients were mixed on fast speed for a total of 6 to 10 minutes until the dough was fully developed. The dough was covered and left to rest for 45 minutes to 1 hour at room temperature. The dough was divided into desired weight and shape and baked at 425° F. until golden brown. The baking time varies based on the product's shape and size. The bread was cooled for at least 15 minutes before cutting.

It was noted that using more of the ultrafine-milled coarse fraction and less of the refined wheat flour in the bread formulas yielded a bread having good qualities. By observing the different formulas which replaced increasing amounts of the refined wheat flour with the ultrafine-milled coarse fraction, it was determined that the bread formula which replaced 50% of the refined wheat flour with the ultrafine-milled coarse fraction still exhibited good texture, appearance, and taste compared to the other formulas, showing that it is possible to use the ultrafine-milled course fraction to make bread that has more concentrated wheat nutrients than 100% whole wheat bread.

Example 10

Tortillas

Tortilla formula 1 was made with the ultrafine-milled coarse fraction. The other ingredients in the tortilla included whole wheat flour, gluten, resistant starch, soy protein isolate, oat fiber, water, shortening, salt, baking powder, fumaric acid, calcium propionate, sodium metabisulfite, potassium sorbate and sucralose. The amounts of each ingredient used are listed in FIG. 13.

The tortilla formula was prepared by mixing all of the ingredients, except water, until well blended. Then, the water (26.5° C.) was added to the tortilla mix and was blended at low speed until the dry ingredients were hydrated (approximately two minutes). Using the dough-hook attachment of the mixer, the dough was mixed on medium speed until the dough was fully developed. The dough was divided into the desired piece size, rounded and proofed prior to pressing and baking.

Observations were that the ultrafine-milled coarse fraction could be used to replace refined wheat flour in a high fiber tortilla application. It was noted that using more of the ultrafine-milled coarse fraction and less of the refined wheat flour yielded a tortilla having good qualities and good processing characteristics.

Example 11

Crisped Cereal

A high-protein, multigrain crisped cereal was made using ultrafine-milled coarse fraction. The other ingredients in the crisped cereal included long grain rice flour, soy protein isolate, whole oat flour, toasted oat flour, malt extract, sugar and salt. Amounts of these ingredients are shown in FIG. 14. Formula 1 used 100% long grain rice flour while Formula 2 replaced 24% of the rice flour with ultrafine-milled coarse fraction. The crisped cereal formulas were prepared by mixing together the dry ingredients until well blended. The dry ingredient blend was blended with water and processed in a twin-screw extruder using equipment, conditions and techniques well-known in the art. The resulting product was an extruded crisped cereal. It was noted that replacing a portion of the long grain rice flour with ultrafine-milled coarse fraction, yielded a crisp with good flavor, appearance and texture. The crisped cereal can be used in ready-to-eat cereal products, cereal bar applications and sweet or savory snack mixes.

Example 12

Pasta

Two separate pasta formulas were made using various amounts of whole-grain wheat flour. Pasta Formula 1 used 100% of the flour as durum semolina and was considered the control. Pasta Formula 2 replaced 52% of the durum semolina with ultrafine-milled whole-grain wheat flour. The other ingredients in the pasta were dried egg whites and water. The amounts of each ingredient used are listed in FIG. 15.

The dry ingredients were blended together to form the dry ingredient mixture. Warm water (36-40° C.) in the amount of 28-32% of the dry ingredients was incorporated into the dry ingredient mixture in a high-speed mixer to form a dough. The dough was extruded into an elbow macaroni shape and dried at 78° C. for approximately four hours.

It was noted that replacing 52% of the durum semolina with ultrafine-milled whole-grain wheat flour yielded a pasta with good texture, flavor and appearance. The pasta containing 51% ultrafine-milled whole-grain wheat flour had a golden brown color that is more similar to retail pastas made with different amounts of whole wheat, but had a smooth, non-gritty texture that is more similar to pastas made with durum semolina or refined wheat flour.

Example 13

Pasta

Pasta with Ultrafine-Milled Coarse Fraction.

Two separate pasta formulas were made using various amounts of ultrafine-milled coarse fraction. Pasta formula 3 used 100% of the flour as durum semolina and was considered the control. Pasta formula 2 replaced 24% of the durum semolina with ultrafine-milled coarse fraction. The other ingredients in the pasta were dried egg white and water. The amounts of each ingredient used are listed in FIG. 15.

The dry ingredients were mixed together until well-blended. 27.5 parts of water was blended into 72.5 parts of the dry ingredient blend to form a dough. The dough was extruded through a bench top pasta machine into a fettucini shape. The fresh pasta was cooked in boiling water until cooked through.

It was observed that Formula 4, containing the ultrafine-milled coarse fraction had a good flavor, texture and appearance and was slightly darker in color as compared to the Formula 3 pasta.

Thus, there has been shown and described a method of making ultrafine-milled whole-grain flour, and products thereof, along with an ultrafine-milled coarse fraction and products thereof which fulfills all the objects and advantages sought therefore. It is apparent to those skilled in the art, however, that many changes, variations, modifications, and other uses and applications to the method and products thereof are possible, and also such changes, variations, modifications, and other uses and applications which do not depart from the spirit and scope of the invention are deemed to be covered by the invention, which is limited only by the claims which follow.

REFERENCES

All references cited in the preceding text of the patent application or in the following reference list, to the extent that they provide exemplary, procedural, or other details supplementary to those set forth herein, are specifically incorporated by reference to the same extent as if each individual publication or patent application was specifically and individually indicated to be incorporated by reference.

Agricultural Research, "*Back to the Old Grind-er,*" page 21, May 2000.

Marquart, Len, Gary Fulcher and Joanne Slavin, "*Whole Grains and Health—Past, Present and Future,*" Technical Bulletin, Volume XXV, Issue 2, February 2003

USDA/USDHHS. Healthy People 2010: Objectives for improving health. U.S. Department of Agriculture/U.S. Department of Health and Human Services, Office of Disease Prevention and Health Promotion. U.S. Government Printing Office, Washington, DC. 2001. http://www.health.gov/healthypeople/.

USDA/USDHHS "2005 Dietary Guidelines Advisory Committee Report." http://www.health.gov/dietaryguidelines/dga2005/report/.

Wu, X., Beecher, G. R., Holden, J. M., Haytowitz, D. B., Gebhardt, S. E., and Prior, R. L., "Lipophilic and Hydrophilic Antioxidant Capacities of Common Foods in the United States." J. Agric. Food Chem. 2004, 52: 4026-4037.

What is claimed is:

1. A continuous flow grain milling process for producing a milled coarse fraction, comprising the steps of:
   (a) offering a quantity of cleaned and tempered wheat kernels;
   (b) milling the wheat kernels into a fine fraction, consisting essentially of endosperm and a coarse fraction comprising bran and germ;
   (c) separating the fine fraction from the coarse fraction; and
   (d) separately milling the coarse fraction in a gap mill having a conical rotor to form a milled coarse fraction,
   wherein the milled coarse fraction of step (d) contains substantially all the bran and germ of an unmilled coarse fraction of step (c), and
   wherein the milled coarse fraction has a particle size distribution such that greater than 98% passes through a U.S. 70 wire screen.

2. A process for producing an edible product comprising:
   (a) obtaining a quantity of a milled coarse fraction of wheat prepared according to the process of claim 1; and
   (b) mixing at least a portion of the quantity of the obtained milled coarse fraction with additional ingredients to produce an edible product comprising the milled coarse fraction.

3. The process for producing an edible product of claim 2, wherein the edible product is selected from the group consisting of: a food product, a snack product, and a bakery product.

4. The process for producing an edible product of claim 3, wherein the food product is a pasta, ready-to-eat cereal, ready-to-drink beverage, instant beverage, meat extender, meat (vegetarian) substitute, nutritional bar, confectionery, seasoning blend, gravy or sauce mix, soup mix, coating, or breading.

5. The process for producing an edible product of claim 3, wherein the bakery product is a bread, bagel, brownie, muffin, waffle, pizza crust, cookie, pastry, pie crust, cake, quick bread, sweet roll, donut, bakery mix, fruit and grain bar, tortilla, or par-baked bakery product.

6. The process for producing an edible product of claim 3, wherein the snack product is a cracker, microwavable snack product, extruded snack product, or snack chip.

7. The process of claim 3 for producing an edible product, wherein the coarse fraction is milled in an air attrition gap mill having and adjustable grinding gap between the conical rotor and a corrugated baffle.

8. The process for producing an edible product of claim 2, wherein the milled coarse fraction comprises about 1% to about 100%, inclusive, of total grain flour in the edible product by mass.

9. The process for producing an edible product of claim 2, wherein the portion of the milled coarse fraction comprises about 20% to about 25%, inclusive, of total grain flour in the edible product by mass.

10. The process for producing an edible product of claim 2, wherein the portion of the milled coarse fraction comprises between about 25% and about 100% of total grain flour in the edible product by mass.

11. A process for producing blended grain flour, the process comprising: Obtaining an amount of milled coarse fraction prepared according to the process of claim 1; and mixing an amount of grain flour with an amount of the milled coarse fraction thereby forming a blended grain flour.

12. The process of claim 11, wherein the amount of the milled coarse fraction is between 1% and 100% of the total blended grain flour by mass.

13. The process of claim 11, wherein the amount of the milled coarse fraction is about 20% to about 25%, inclusive, of the total blended grain flour by mass.

14. The process of claim 11, wherein the amount of the milled coarse fraction is about 25% to about 100% of the total blended grain flour by mass.

15. The process for producing a milled coarse fraction of claim 1, wherein said bran and germ content is determined by relative ash content.

16. The process for producing a milled coarse fraction of claim 1, said milled coarse fraction having an ash content that is at least 95% of the ash content of the separated coarse fraction of step (c).

17. The process for producing a milled coarse fraction of claim 1, said milled coarse fraction having a particle size distribution such that greater than 85% passes through a U.S. 100 wire screen.

18. The process for producing a milled coarse fraction of claim 17, said milled coarse fraction having a particle size distribution such that greater than 90% passes through a U.S. 100 wire screen.

19. The process for producing milled coarse fraction of claim 17, said milled coarse fraction having a particle size distribution such that greater than 95% passes through a U.S. 100 wire screen.

20. The process of claim 1, wherein the coarse fraction is milled in an air attrition gap mill having a conical rotor operating at a tip speed of 115 m/s to 130 m/s.

21. The process of claim 1, wherein the coarse fraction is milled in an air attrition gap mill having an adjustable grinding gap between the conical shaped rotor and a corrugated baffle conical rotor.

22. The milled coarse fraction of claim 21, having an ash content that is at least 95% of the ash content of an unmilled coarse fraction of step (c).

23. The milled coarse fraction of claim 21, having a particle size distribution such that greater than 90% passes through a U.S. 100 wire screen.

24. The milled coarse fraction of claim 23, having a particle size distribution such that greater than 95% passes through a U.S. 100 wire screen.

25. A process for producing a blended grain flour the process comprising:
(a) obtaining a milled coarse fraction prepared according to the process of claim 21; and
(b) mixing an amount of grain flour with an amount of the obtained milled coarse fraction, hereby forming a blended grain flour.

26. The process of claim 25, wherein said milled coarse fraction is mixed with fine wheat flour.

27. The process of claim 25, said blended grain flour comprising at least 20% milled coarse fraction.

28. The process of claim 1, wherein said wheat is a variety of white wheat.

29. The process of claim 1, wherein said wheat is a variety of red wheat.

30. The process of claim 1, wherein said wheat is durum wheat.

31. The process of claim 1, wherein said wheat is hard winter wheat.

* * * * *